(12) United States Patent
Qasimi et al.

(10) Patent No.: US 9,003,877 B2
(45) Date of Patent: Apr. 14, 2015

(54) FLOW SENSOR ASSEMBLY

(71) Applicant: Honeywell International Inc., Morristown, NJ (US)

(72) Inventors: Mohammed Abdul Javvad Qasimi, Hilliard, OH (US); Josh M. Fribley, Columbus, OH (US); Andrew J. Milley, Hilliard, OH (US)

(73) Assignee: Honeywell International Inc., Morristown, NJ (US)

( * ) Notice: Subject to any disclaimer, the term of this patent is extended or adjusted under 35 U.S.C. 154(b) by 302 days.

(21) Appl. No.: 13/679,894

(22) Filed: Nov. 16, 2012

(65) Prior Publication Data

US 2013/0139584 A1    Jun. 6, 2013

Related U.S. Application Data

(63) Continuation-in-part of application No. 13/018,037, filed on Jan. 31, 2011, now Pat. No. 8,418,549, and a continuation-in-part of application No. PCT/US2010/038571, filed on Jun. 15, 2012.

(51) Int. Cl.
*G01F 1/68* (2006.01)
*G01F 1/684* (2006.01)
*G01F 5/00* (2006.01)

(52) U.S. Cl.
CPC ............... *G01F 1/6842* (2013.01); *G01F 5/00* (2013.01)

(58) Field of Classification Search
USPC ............... 73/204.23, 204.22, 204.21, 204.11
See application file for complete search history.

(56) References Cited

U.S. PATENT DOCUMENTS

| 2,746,296 A | 5/1956 | Stover |
| 3,216,249 A | 11/1965 | Joel |
| 3,410,287 A | 11/1968 | Van Der Heyden et al. |
| 3,433,069 A | 3/1969 | Trageser |
| 3,559,482 A | 2/1971 | Baker et al. |
| 3,640,277 A | 2/1972 | Adelberg |
| 3,785,206 A | 1/1974 | Benson et al. |
| 3,830,104 A | 8/1974 | Gau |
| 3,838,598 A | 10/1974 | Tompkins |

(Continued)

FOREIGN PATENT DOCUMENTS

| DE | 3905746 | 8/1990 |
| DE | 102004019521 | 11/2005 |

(Continued)

OTHER PUBLICATIONS

"Schematic Cross-Section for AWM43600," 1 page, prior to Jan. 31, 2011.

(Continued)

*Primary Examiner* — Jewel V Thompson
(74) *Attorney, Agent, or Firm* — Seager Tufte & Wickhem LLC

(57) ABSTRACT

A flow sensor assembly that may include features that help prevent moisture from reaching a sensor die of the flow sensor assembly. In some cases, such features may include a bypass channel that is configured to reverse the direction of the flow of fluid at least once upstream of the sensor die. In some cases, an encapsulant may cover one or more bond pads of the sensor die. In some cases, an output of the flow sensor assembly may be a raw sensor output signal produced by the one or more sensor elements of the sensor die, without significant processing of the raw sensor signal.

17 Claims, 10 Drawing Sheets

(56) References Cited

U.S. PATENT DOCUMENTS

| | | | |
|---|---|---|---|
| 3,895,531 | A | 7/1975 | Lambert |
| 3,952,577 | A | 4/1976 | Hayes et al. |
| 3,981,074 | A | 9/1976 | Yamamoto et al. |
| 4,030,357 | A | 6/1977 | Wemyss |
| 4,041,757 | A | 8/1977 | Baker et al. |
| 4,100,801 | A | 7/1978 | LeMay |
| 4,326,214 | A | 4/1982 | Trueblood |
| 4,343,194 | A | 8/1982 | Dehart et al. |
| 4,411,292 | A | 10/1983 | Schiller |
| 4,418,723 | A | 12/1983 | Koni et al. |
| 4,444,060 | A | 4/1984 | Yamamoto |
| RE31,570 | E | 5/1984 | Drexel |
| 4,478,076 | A | 10/1984 | Bohrer |
| 4,478,077 | A | 10/1984 | Bohrer et al. |
| 4,481,828 | A | 11/1984 | Cheng |
| 4,494,405 | A | 1/1985 | Oosuga et al. |
| 4,501,144 | A | 2/1985 | Higashi et al. |
| 4,546,655 | A | 10/1985 | Victor |
| 4,581,945 | A | 4/1986 | Rusz |
| 4,648,270 | A * | 3/1987 | Johnson et al. ............... 73/202.5 |
| 4,653,321 | A | 3/1987 | Cunningham et al. |
| 4,655,088 | A | 4/1987 | Adams |
| 4,668,102 | A | 5/1987 | Mott |
| 4,672,997 | A | 6/1987 | Landis et al. |
| 4,677,858 | A | 7/1987 | Ohnhaus |
| 4,696,194 | A | 9/1987 | Taylor |
| 4,768,386 | A | 9/1988 | Taddeo |
| 4,790,181 | A | 12/1988 | Aine |
| 4,800,754 | A | 1/1989 | Korpi |
| 4,825,704 | A | 5/1989 | Aoshima et al. |
| 4,829,818 | A * | 5/1989 | Bohrer ....................... 73/204.22 |
| 4,839,038 | A | 6/1989 | Mclain, II |
| 4,856,328 | A | 8/1989 | Johnson |
| 4,900,242 | A | 2/1990 | Maus et al. |
| 4,914,742 | A | 4/1990 | Higashi et al. |
| 4,961,344 | A | 10/1990 | Rodder |
| 4,976,283 | A | 12/1990 | Wildfang et al. |
| 5,000,478 | A | 3/1991 | Kerastas |
| 5,050,429 | A | 9/1991 | Nishimoto et al. |
| 5,063,786 | A | 11/1991 | Sanderson et al. |
| 5,063,787 | A | 11/1991 | Khuzai et al. |
| 5,081,866 | A | 1/1992 | Ochiai et al. |
| 5,088,332 | A | 2/1992 | Merilainen et al. |
| 5,107,441 | A | 4/1992 | Decker |
| 5,161,410 | A | 11/1992 | Davey et al. |
| 5,220,830 | A | 6/1993 | Bonne |
| 5,231,877 | A | 8/1993 | Henderson |
| 5,249,462 | A | 10/1993 | Bonne |
| 5,253,517 | A | 10/1993 | Molin et al. |
| 5,295,394 | A | 3/1994 | Suzuki |
| 5,303,584 | A | 4/1994 | Ogasawara et al. |
| 5,319,973 | A | 6/1994 | Crayton et al. |
| 5,332,005 | A | 7/1994 | Baan |
| 5,341,841 | A | 8/1994 | Schaefer |
| 5,341,848 | A | 8/1994 | Laws |
| 5,357,793 | A | 10/1994 | Jouwsma |
| 5,379,650 | A | 1/1995 | Kofoed et al. |
| 5,385,046 | A | 1/1995 | Yamakawa et al. |
| 5,400,973 | A | 3/1995 | Cohen |
| 5,404,753 | A | 4/1995 | Hecht et al. |
| 5,481,925 | A | 1/1996 | Woodbury |
| 5,535,633 | A | 7/1996 | Kofoed et al. |
| 5,537,870 | A | 7/1996 | Zurek et al. |
| 5,581,027 | A | 12/1996 | Juntunen |
| 5,609,303 | A | 3/1997 | Cohen |
| 5,634,592 | A | 6/1997 | Campau |
| 5,717,145 | A | 2/1998 | Yasuhara et al. |
| 5,735,267 | A | 4/1998 | Tobia |
| 5,736,651 | A | 4/1998 | Bowers |
| 5,741,968 | A | 4/1998 | Arai |
| 5,750,892 | A | 5/1998 | Huang et al. |
| 5,763,787 | A | 6/1998 | Gravel et al. |
| 5,781,291 | A | 7/1998 | So et al. |
| 5,789,660 | A | 8/1998 | Kofoed et al. |
| 5,792,958 | A | 8/1998 | Speldrich |
| 5,817,950 | A | 10/1998 | Wiklund et al. |
| 5,829,685 | A | 11/1998 | Cohen |
| 5,844,135 | A | 12/1998 | Brammer et al. |
| 5,861,561 | A | 1/1999 | Van Cleve et al. |
| 5,866,824 | A | 2/1999 | Schieber |
| 5,942,694 | A | 8/1999 | Robins et al. |
| 6,044,716 | A | 4/2000 | Yamamoto |
| 6,119,730 | A | 9/2000 | McMillan |
| 6,128,963 | A | 10/2000 | Bromster |
| 6,142,014 | A | 11/2000 | Rilling |
| 6,164,143 | A | 12/2000 | Evans |
| 6,247,495 | B1 | 6/2001 | Yamamoto et al. |
| 6,308,553 | B1 | 10/2001 | Bonne et al. |
| 6,312,389 | B1 | 11/2001 | Kofoed et al. |
| 6,322,247 | B1 | 11/2001 | Bonne et al. |
| 6,393,907 | B1 | 5/2002 | Yamakawa et al. |
| 6,526,822 | B1 | 3/2003 | Maeda et al. |
| 6,527,385 | B2 | 3/2003 | Koitabashi et al. |
| 6,543,449 | B1 | 4/2003 | Woodring et al. |
| 6,553,808 | B2 | 4/2003 | Bonne et al. |
| 6,561,021 | B2 | 5/2003 | Uramachi et al. |
| 6,579,087 | B1 | 6/2003 | Vroliik |
| 6,591,674 | B2 * | 7/2003 | Gehman et al. ............ 73/204.22 |
| 6,655,207 | B1 | 12/2003 | Speldrich et al. |
| 6,681,623 | B2 | 1/2004 | Bonne et al. |
| 6,715,339 | B2 | 4/2004 | Bonne et al. |
| 6,729,181 | B2 * | 5/2004 | Mayer et al. ............... 73/204.22 |
| 6,742,399 | B2 | 6/2004 | Kunz et al. |
| 6,761,165 | B2 | 7/2004 | Strickland, Jr. |
| 6,769,299 | B2 | 8/2004 | Forster et al. |
| 6,779,393 | B1 | 8/2004 | Muller et al. |
| 6,779,395 | B2 | 8/2004 | Hornung et al. |
| 6,813,944 | B2 | 11/2004 | Mayer et al. |
| 6,826,966 | B1 | 12/2004 | Karbassi et al. |
| 6,843,139 | B2 | 1/2005 | Schumacher et al. |
| 6,871,534 | B1 | 3/2005 | Hamada et al. |
| 6,871,537 | B1 | 3/2005 | Gehman et al. |
| 6,871,538 | B2 | 3/2005 | Fujiwara et al. |
| 6,886,401 | B2 | 5/2005 | Ito et al. |
| 6,901,795 | B2 | 6/2005 | Naguib et al. |
| 6,904,799 | B2 | 6/2005 | Cohen et al. |
| 6,904,907 | B2 | 6/2005 | Speldrich et al. |
| 6,907,787 | B2 | 6/2005 | Cook et al. |
| 6,915,682 | B2 | 7/2005 | Renninger et al. |
| 6,928,865 | B2 | 8/2005 | Ito et al. |
| 6,945,107 | B2 | 9/2005 | Tanaka et al. |
| 6,957,586 | B2 | 10/2005 | Sprague |
| 7,000,298 | B2 | 2/2006 | Cook et al. |
| 7,000,612 | B2 | 2/2006 | Jafari et al. |
| 7,028,560 | B2 | 4/2006 | Castillon Levano |
| 7,032,463 | B2 | 4/2006 | Misholi et al. |
| 7,036,366 | B2 | 5/2006 | Emmert et al. |
| 7,043,978 | B2 | 5/2006 | Goka et al. |
| 7,059,184 | B2 | 6/2006 | Kanouda et al. |
| 7,100,454 | B2 | 9/2006 | Hasunuma |
| 7,107,834 | B2 | 9/2006 | Meneghinin et al. |
| 7,121,139 | B2 | 10/2006 | Shajii et al. |
| 7,154,372 | B2 | 12/2006 | Vanha et al. |
| 7,243,541 | B1 | 7/2007 | Bey et al. |
| 7,258,003 | B2 | 8/2007 | Padmanabhan et al. |
| 7,278,309 | B2 | 10/2007 | Dmytriw et al. |
| 7,278,326 | B2 | 10/2007 | Kobayashi et al. |
| 7,305,877 | B2 | 12/2007 | Beyrich et al. |
| 7,325,443 | B2 | 2/2008 | De Jonge et al. |
| 7,337,677 | B2 | 3/2008 | Mizohata |
| 7,343,823 | B2 | 3/2008 | Speldrich |
| 7,347,785 | B2 | 3/2008 | Worman, Jr. et al. |
| 7,353,719 | B2 | 4/2008 | Hiura et al. |
| 7,373,819 | B2 | 5/2008 | Engler et al. |
| 7,383,726 | B2 * | 6/2008 | Ike et al. .................... 73/204.22 |
| 7,386,166 | B2 | 6/2008 | Curry et al. |
| 7,430,918 | B2 | 10/2008 | Selvan et al. |
| 7,454,984 | B1 | 11/2008 | Ross et al. |
| 7,464,611 | B2 | 12/2008 | Matter et al. |
| 7,472,580 | B2 | 1/2009 | Lyons et al. |
| 7,479,255 | B2 | 1/2009 | Otani et al. |
| 7,490,511 | B2 | 2/2009 | Mayet et al. |
| 7,513,149 | B1 | 4/2009 | Ricks |
| 7,516,761 | B2 | 4/2009 | Setescak |

(56) References Cited

U.S. PATENT DOCUMENTS

| | | | |
|---|---|---|---|
| 7,520,051 B2 | 4/2009 | Becke et al. | |
| 7,549,332 B2 | 6/2009 | Yamashita et al. | |
| 7,568,383 B2 | 8/2009 | Colvin et al. | |
| 7,571,641 B2 | 8/2009 | Kozawa et al. | |
| 7,603,898 B2 | 10/2009 | Speldrich | |
| 7,631,562 B1 | 12/2009 | Speldrich | |
| 7,647,835 B2 | 1/2010 | Speldrich | |
| 7,654,157 B2 | 2/2010 | Speldrich | |
| 7,661,303 B2 | 2/2010 | Kohno et al. | |
| 7,698,938 B2 | 4/2010 | Inagaki et al. | |
| 7,698,958 B2 | 4/2010 | Matter et al. | |
| 7,704,774 B2 | 4/2010 | Mayer et al. | |
| 7,730,793 B2 | 6/2010 | Speldrich | |
| 7,757,553 B2 | 7/2010 | Meier et al. | |
| 7,765,865 B2 * | 8/2010 | Ike et al. | 73/204.22 |
| 7,793,410 B2 * | 9/2010 | Padmanabhan et al. | 29/832 |
| 7,805,986 B2 | 10/2010 | Colvin et al. | |
| 7,832,269 B2 | 11/2010 | Bey, Jr. et al. | |
| 7,878,980 B2 | 2/2011 | Ricciardelli | |
| 7,891,238 B2 | 2/2011 | Becke et al. | |
| 7,892,488 B2 | 2/2011 | Speldrich et al. | |
| 7,905,153 B2 | 3/2011 | Jasnie | |
| 8,113,046 B2 | 2/2012 | Speldrich et al. | |
| 8,252,158 B2 | 8/2012 | Chapples et al. | |
| 2002/0078744 A1 | 6/2002 | Gehman et al. | |
| 2003/0062045 A1 | 4/2003 | Woodring et al. | |
| 2004/0118200 A1 | 6/2004 | Hornung et al. | |
| 2005/0016534 A1 | 1/2005 | Ost | |
| 2005/0039809 A1 | 2/2005 | Speldrich | |
| 2005/0247106 A1 | 11/2005 | Speldrich et al. | |
| 2005/0247107 A1 | 11/2005 | Speldrich et al. | |
| 2006/0017207 A1 | 1/2006 | Bechtold et al. | |
| 2006/0201247 A1 | 9/2006 | Speldrich et al. | |
| 2006/0225488 A1 | 10/2006 | Speldrich | |
| 2007/0176010 A1 | 8/2007 | Figi et al. | |
| 2008/0163683 A1 | 7/2008 | Becke et al. | |
| 2009/0265144 A1 | 10/2009 | Speldrich | |
| 2010/0013165 A1 | 1/2010 | Speldrich et al. | |
| 2010/0101332 A1 | 4/2010 | Speldrich | |
| 2010/0154559 A1 | 6/2010 | Speldrich | |
| 2011/0226053 A1 | 9/2011 | Sorenson et al. | |
| 2011/0247411 A1 | 10/2011 | Speldrich | |
| 2012/0035866 A1 | 2/2012 | Qasimi et al. | |
| 2012/0186336 A1 | 7/2012 | Speldrich et al. | |
| 2012/0192642 A1 | 8/2012 | Speldrich et al. | |
| 2012/0192643 A1 | 8/2012 | Speldrich et al. | |

FOREIGN PATENT DOCUMENTS

| | | |
|---|---|---|
| EP | 0094497 | 11/1983 |
| EP | 0255056 | 2/1988 |
| EP | 1655123 | 5/2006 |
| EP | 1691175 | 8/2006 |
| EP | 1895278 | 3/2008 |
| EP | 1959242 | 8/2008 |
| EP | 2068129 | 10/2009 |
| EP | 2157411 | 2/2010 |
| EP | 2199758 | 6/2010 |
| EP | 2270441 | 1/2011 |
| FR | 377743 | 9/1907 |
| GB | 2123564 | 2/1984 |
| JP | 49120131 | 11/1974 |
| JP | 58221119 | 12/1983 |
| JP | 3099230 | 4/1991 |
| JP | 4069521 | 3/1992 |
| JP | 7083713 | 3/1995 |
| JP | 10239130 | 9/1998 |
| JP | 10307047 | 11/1998 |
| WO | WO 9221940 | 12/1992 |
| WO | WO 9315373 | 8/1993 |
| WO | WO 9517651 | 6/1995 |
| WO | WO 0111322 | 2/2001 |
| WO | WO 0161282 | 8/2001 |
| WO | WO 0198736 | 12/2001 |
| WO | WO 2006131531 | 12/2006 |
| WO | WO 2007095528 | 8/2007 |
| WO | WO 2007137978 | 12/2007 |
| WO | WO 2008070603 | 6/2008 |
| WO | WO 2011159275 | 12/2011 |

OTHER PUBLICATIONS

Bodycote, "Honeywell Sensing and Control, Sensiron SDP610 Competitive Teardown Analysis," 15 pages, Feb. 19, 2009.
Copy of Search Report for Corresponding Application No. 12153190.-1234 Dated Jun. 5, 2012.
Copy of Search Report for Corresponding United Kingdom application Serial No. GB1104000.3.
Honeywell, "Airflow Sensors Line Guide," 6 pages, Nov. 2010.
Honeywell, "Airflow, Force and Pressure Sensors," Product Range Guide, 20 pages, Mar. 2011.
Honeywell, "AWM43600V, Issue No. 4," 1 page, Jul. 29, 1996.
Honeywell, "AWM43600V, Part No. SS12177," 1 page, Jul. 10, 1998.
Honeywell, "Housing, Flowtube, Drawing 50005182," 1 page, Sep. 2, 2004.
Honeywell, "Housing, Plastic, Drawing 050.1.156," 1 page, Jul. 8, 1998.
Honeywell, "Housing, Subassembly, Drawing SS-12148," 1 page, Oct. 14, 1998.
Honeywell, "Sensing and Control Interactive Catalog," 4 pages, prior to Mar. 22, 2010.
Honeywell, "Tubing, Plastic, Drawing SS-12062," 1 page, Apr. 5, 1999.
Honeywell, "Tubing, Plastic, Drawing SS-12160," 1 page, drawn Jan. 28, 1998.
Honeywell, "Mass Airflow Sensors, AWM720P1 Airflow," 4 pages, prior to Mar. 22, 2010.
Honeywell, "Mass Airflow Sensors, AWM9000 Airflow," 6 pages, 2003.
Honeywell, "Reference and Application Data, Microbridge Airflow Sensors, "1 page, prior to Mar. 22, 2010.

\* cited by examiner

A-A

B-B

C-C

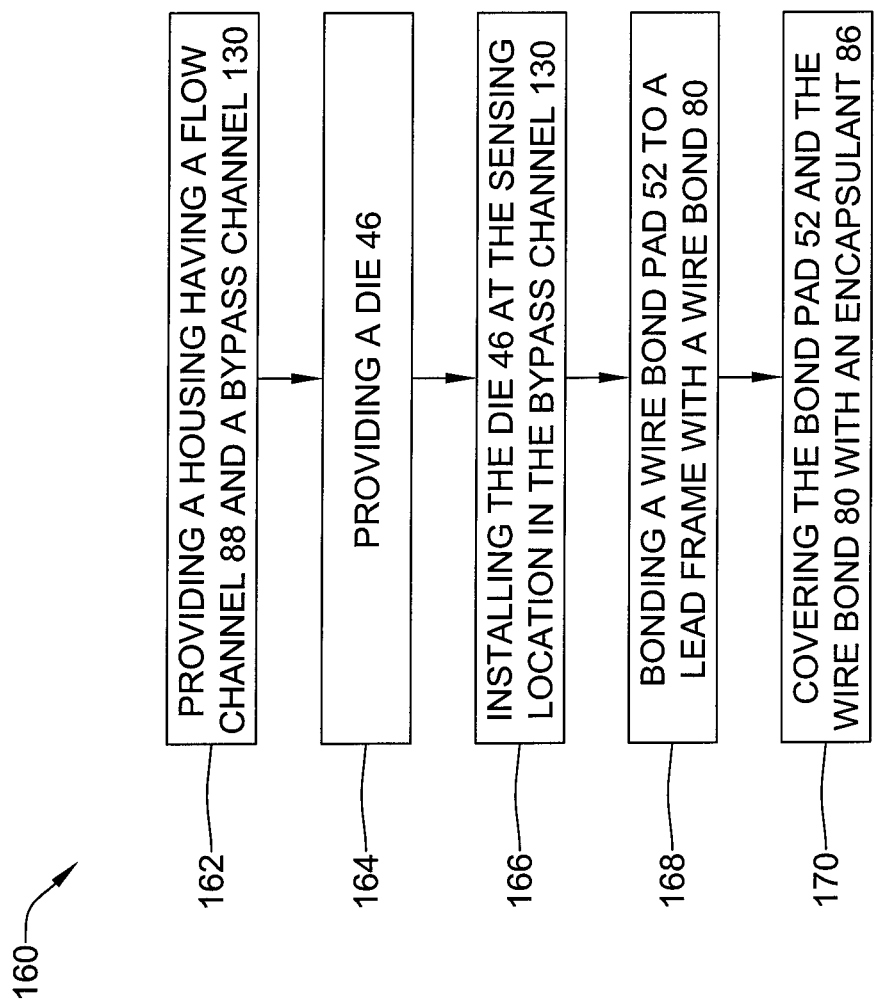

FLOW SENSOR ASSEMBLY

This application is a continuation-in-part of U.S. application Ser. No. 13/018,037, filed Jan. 31, 2011, entitled "FLOW SENSOR ASSEMBLY WITH INTEGRAL BYPASS CHANNEL", which is incorporated hereby by reference.

This application is also a continuation-in-part of International Application No. PCT/US2010/038571, filed Jun. 15, 2010, entitled "MOISTURE RESISTANT MASS FLOW SENSOR", which is incorporated hereby by reference.

TECHNICAL FIELD

The disclosure relates generally to sensors, and more particularly, to flow sensors.

BACKGROUND

Flow sensors are currently used in many applications including commercial, industrial, manufacturing, residential, medical, transportation, government, and military applications. For example, flow sensors are often used in manufacturing processes to measure and control flow rates of reactants in chemical processes, in internal combustion engines to measure and control a ratio of air and fuel, and in other applications in which detecting a rate of fluid flow is desirable. In another example, flow sensors are often used in medical ventilators or respirators. Medical ventilators provide supplemental oxygen to patients unable to breathe normally on their own accord. Medical ventilators may include a source of pressurized air or oxygen-rich air which is fluidly connected to the patient through a fluid conduit. One type of flow sensor used in medical ventilators is a thermal anemometer type flow sensor. A thermal anemometer mass flow sensor may be formed as a Micro Electro Mechanical System (MEMS), and may include a microbridge that is fairly thermally isolated from the rest of the sensor substrate. A current is typically provided through a conductive heater element that is on the microbridge. An upstream resistive temperature sensor may be located on the microbridge upstream of the conductive heater element, and a downstream resistive temperature sensor may be located on the microbridge downstream of the conductive heater element. The flow rate of a fluid past the flow sensor will tend to cool the first resistive temperature sensor located on the microbridge upstream of the conductive heater element, and will tend to heat the second resistive temperature sensor located on the microbridge downstream of the conductive heater element. The change in temperature of the first and second resistive temperature sensors may be related to the flow rate of the fluid. This is just one example a flow sensor that is commonly used today.

SUMMARY

This disclosure relates generally to sensors, and more particularly, to sensors that are exposed to a media during use. Although sensor assemblies are known to exist, there is need for improvement to such sensor assemblies.

Accordingly, in one example, the disclosure is directed to a flow sensor assembly that may include a cover (e.g., an electrical substrate) that comprises a major surface having a first portion, a second portion and a third portion, and a plurality of electrical traces. According to this example, the flow sensor assembly may also include a housing physically coupled to the major surface. The housing may include an interior surface oriented to face the major surface, and a plurality of projections that extend from the interior surface toward the major surface. The major surface, the interior surface, and the plurality of projections may define a first substantially enclosed cavity bounded by the first portion, a second substantially enclosed cavity that is fluidly isolated from the first substantially enclosed cavity and bounded by the second portion, and a flow cavity that is fluidly isolated from the first substantially enclosed cavity and from the second substantially enclosed cavity and bounded by the third portion.

In some cases, the flow sensor assembly may further include a flow sensor die (e.g., a mass flow sensor die) physically coupled to the major surface. The flow sensor die may include (i) a sensing portion that is disposed within the flow cavity and configured to sense air flow through the airflow cavity, and (ii) a wire bonding portion that is disposed within the second substantially enclosed cavity and electrically connected to the plurality of electrical traces by a plurality of wire bonds. The plurality of wire bonds may be encapsulated by an encapsulant. Additionally, the flow sensor assembly may include an integrated circuit that is disposed within the first substantially enclosed cavity and electrically coupled to the mass flow sensor die via at least one of the plurality of electrical traces.

In some illustrative cases, the flow sensor assembly may include a housing with an inlet flow port and an outlet flow port, a fluid channel extending between the inlet flow port and the outlet flow port and a bypass channel in the flow cavity. In some instances, the housing may also include one or more partitions positioned in the fluid channel to help promote laminar flow in the fluid channel. The bypass channel may include two taps in fluid communication with the fluid channel. An upstream tap may be connected to the fluid channel at a first upstream location, such as upstream of the one or more partitions (when provided) and downstream of the inlet flow port of the fluid channel. A downstream tap may be connected to the fluid channel at a second downstream location, such as downstream of the one or more partitions (when provided) and upstream of the outlet flow port of the fluid channel. The flow sensor may be in fluid communication with the bypass channel, and may sense a measure related to a flow rate of a fluid flowing through the bypass channel and, hence, the fluid channel. In some cases, one or more features may be provided in the upstream tap, the downstream tap and/or the bypass channel to restrict the fluid flow rate through the bypass channel, thereby extending the effective flow rate range of the flow sensor assembly.

In another example, the disclosure is directed to a method that includes attaching a flow sensor die to a major surface of a cover. In this example, the mass flow sensor die may include a sensing portion and a wire bonding portion, and the wire bonding portion may include a plurality of wire bond pads. Additionally, the plurality of die wire bond pads may be electrically coupled to respective ones of a plurality of cover wire bond pads on the major surface of the cover by respective wire bonds. The method further includes dispensing an adhesive along at least a portion of a plurality of projections extending from an interior surface of a housing. The method may include coupling the housing to the cover by positioning in substantial alignment with the plurality of projections extending from the interior surface of the housing on a predetermined path on the major surface of the cover and contacting the predetermined path and the adhesive. According to this example, the predetermined path defines a first portion, a second portion, and a third portion of the major surface of the cover. In some embodiments, the sensing portion of the mass flow sensor is disposed on the first portion of the cover and the wire bonding portion of the flow sensor and the cover wire bond pads are disposed on the second portion of the major surface of the cover. The interior surface of the housing, the plurality of projections, and the major surface of the cover may define a first substantially enclosed cavity, a second substantially enclosed cavity that is fluidly isolated from the first substantially enclosed cavity, and a flow cavity. An integrated circuit may be disposed within the first substantially enclosed cavity and electrically connected to at least one electrical trace of the cover, and the at least one electrical trace and at least one of the bond wires may electrically connect the mass flow sensor die and the integrated circuit. In some instances, the third portion of the major surface of the cover may bound the first substantially enclosed cavity. Further, according to this example, the wire bonding portion of the mass flow sensor die may be disposed within the second substantially enclosed cavity, and the second portion of the major surface of the cover may bound the second substantially enclosed cavity. Additionally, the sensing portion of the mass flow sensor die may be disposed within the airflow cavity and is configured to sense air flow through the airflow cavity, the first portion of the major surface of the cover may bound the flow cavity, and the flow cavity may be fluidly isolated from the first substantially enclosed cavity and from the second substantially enclosed cavity.

In another example, a flow sensor assembly may include a housing that defines an inlet, an outlet, and a flow channel extending between the inlet and the outlet. The housing may also define a bypass channel that allows part of the flow of fluid through the flow channel to bypass part of the flow channel. In some cases, the bypass channel may be configured to reverse the direction of the flow of fluid in the bypass channel at least once upstream of a sensing location, which may help prevent moisture ingress into the bypass channel. A flow sensor die, sometimes having one or more sense elements, one or more heater elements, and one or more bond pads operatively coupled to the one or more sense elements and the one or more heater elements, may be secured to the housing at the sensing location of the bypass channel, such that the one or more sense elements are in thermal communication with the flow of fluid in the bypass channel. The one or more bond pads of the flow sensor die may be positioned in a first region of the flow sensor die, and the one or more sense elements and the one or more heater elements may be positioned in a second region of the flow sensor die. When the flow sensor die is secured relative to the housing at the sensing location, the housing may include a partition between the first region and the second region of the flow sensor die. In some cases, an encapsulant may be provided adjacent the first region of the flow sensor die to cover the one or more bond pads. The partition of the housing may substantially prevent the encapsulant from covering the one or more sense elements and the one or more heater elements positioned in the second region of the flow sensor die. In some cases, an output of the flow sensor assembly may be a raw sensor output signal produced by the one or more sense elements.

The preceding summary is provided to facilitate a general understanding of some of the innovative features of the present disclosure, and is not intended to be a full description. A full appreciation of the disclosure can be gained by taking the entire specification, claims, drawings, and abstract as a whole.

BRIEF DESCRIPTION OF DRAWINGS

The accompanying figures, in which like reference numerals refer to identical or functionally-similar elements throughout the separate views, and which are incorporated in and form a part of the specification, further show several illustrative embodiments and, together with the description, serve to explain the several illustrative embodiments, wherein:

FIG. 12 is a flow diagram of another illustrative technique for forming a flow sensor assembly.

Figure 1:
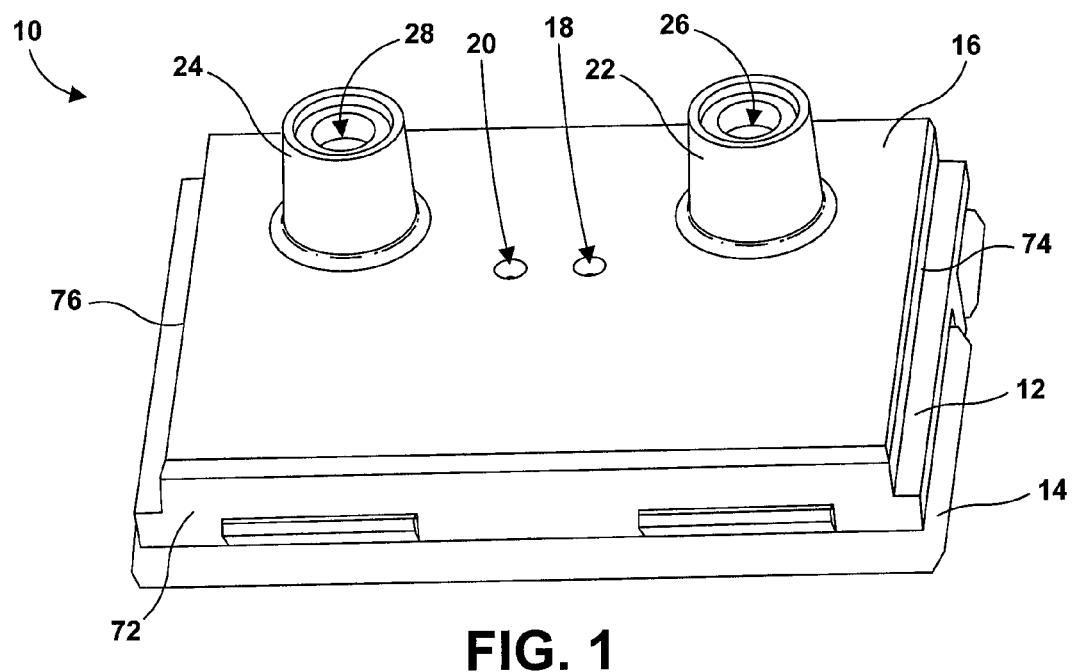
FIG. 1 is a perspective view of an illustrative flow sensor assembly.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings, which are not necessarily to scale, depict several illustrative embodiments and are not intended to limit the scope of the disclosure. Rather, the illustrative embodiments depicted are intended only as exemplary.

FIGS. 1-7 illustrate various views of an illustrative flow sensor assembly 10. In particular, FIG. 1 is a perspective view of an illustrative flow sensor assembly 10. Flow sensor assembly 10 may include a main sensor body having a housing 12 (e.g., a unitary housing member) and a cover 14 (e.g., an electrical substrate). In some embodiments, housing 12 may be formed of a single piece of material. For example, housing 12 may be formed of a single, molded piece of plastic. Housing 12 may facilitate manufacture of flow sensor assembly 10, as compared to a flow sensor assembly that includes a non-unitary housing member having multiple pieces.

Cover 14 may include a suitable substrate that includes electrical traces for electrically connecting various components of flow sensor assembly 10. For example, cover 14 may include a printed circuit board (PCB), a ceramic, such as a thick film network (TFN), or a flexible circuit. In some embodiments, cover 14 may include a multilayer PCB, TFN, or flexible circuit, in which electrical traces may be formed on multiple layers within the PCB, TFN, or flexible circuit. In some examples, electrical traces may be formed on at least one of first major surface 36 or second major surface 38 of cover 14.

Housing 12 may include a major exterior surface 16, which is oriented substantially away from cover 14. Housing 12 may define a first aperture 18 and a second aperture 20 in major exterior surface 16. First aperture 18 and second aperture 20 may extend through housing 12 to a second interior surface 96 (FIG. 6) of housing 12, where second interior surface 96 is oriented toward cover 14. First aperture 18 and second aperture 20 can facilitate fluidic communication between an exterior of flow sensor assembly 10 and a first substantially enclosed cavity 90 (FIG. 6) of flow sensor assembly 10, which is defined by a second major surface 38 of cover 14 and housing 12. In this way, first aperture 18 and second aperture 20 may facilitate filling of the internal cavity with an encapsulant 86 (FIG. 6), such as silicone, after assembly of cover 14 and housing 12 to form flow sensor assembly 10, as will be described in further detail below.

Figure 2:
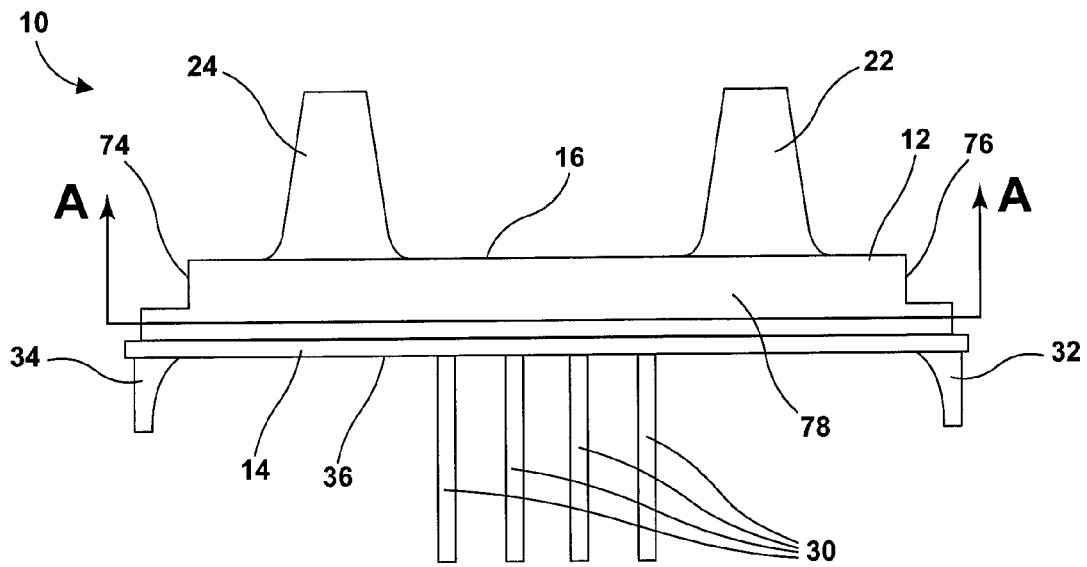
FIG. 2 is a plan view of the illustrative flow sensor assembly depicted in FIG. 1.
Figure 6:
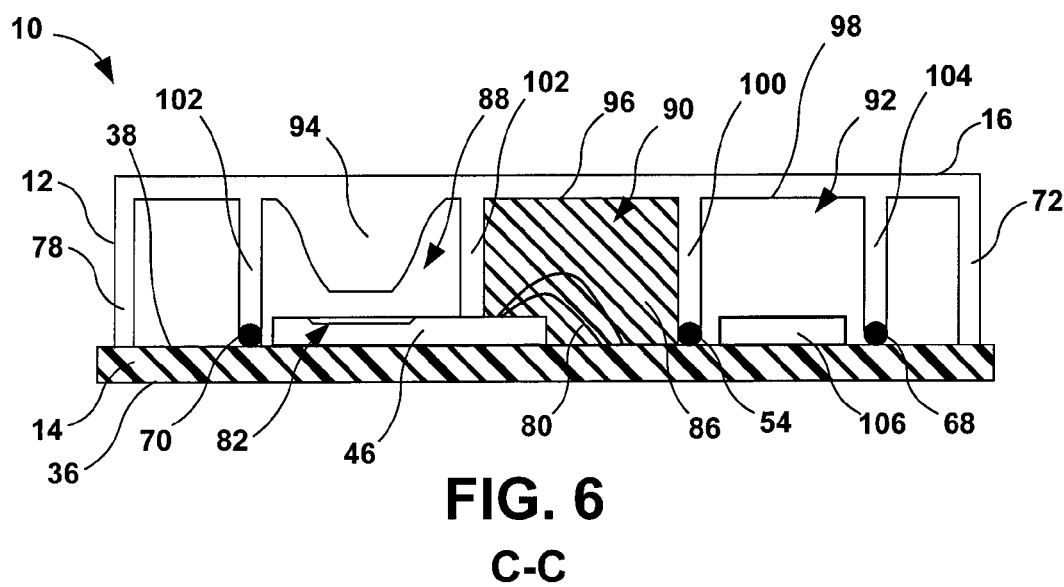
FIG. 6 is section diagram of the illustrative flow sensor assembly depicted in FIG. 4, take along line C-C.

Housing 12 may also include a first external projection 24 that defines a inlet port 28 in fluidic communication with and optionally defines flow channel 88 (e.g., an airflow cavity) (FIG. 6) of flow sensor assembly 10, which is defined by second major surface 38 of cover 14 and integral housing 12 and configured to accept a flow of fluid. Further, integral housing 12 may include a second external projection 22 that defines an outlet port 26, also in fluidic communication with flow channel 88 of flow sensor assembly 10. As illustrated in FIG. 2, inlet port 28 may be fluidly connected to a fluid source and function as an inlet orifice through which the fluid enters flow channel 88 (FIG. 6). Outlet port 26 may function as an outlet orifice from which the fluid exits flow channel 88 into a subsequent flow channel. In other embodiments, inlet port 28 may be configured as an outlet orifice and outlet port 26 may be configured as an inlet orifice. In some embodiments, at least one of first external projection 24 and second external projection 22 may be configured to be couple to a conduit which defines a fluid flow path. For example, first external projection 24 may be coupled to a flexible tube that is connected to a fluid source. The conduit and first external projection 24 may be affixed to each other using friction fit, an adhesive, or another mechanical fixation mechanism, such as a clamp, clip, or the like. Although first external projection 24 and second external projection 22 are illustrated in FIG. 1 as extending from major exterior surface 16, in other embodiments, projections 24 and 22 may extend from other surfaces of housing 12, such as, for example, one or more of walls 72, 74, 76, or 78.

Figure 3:
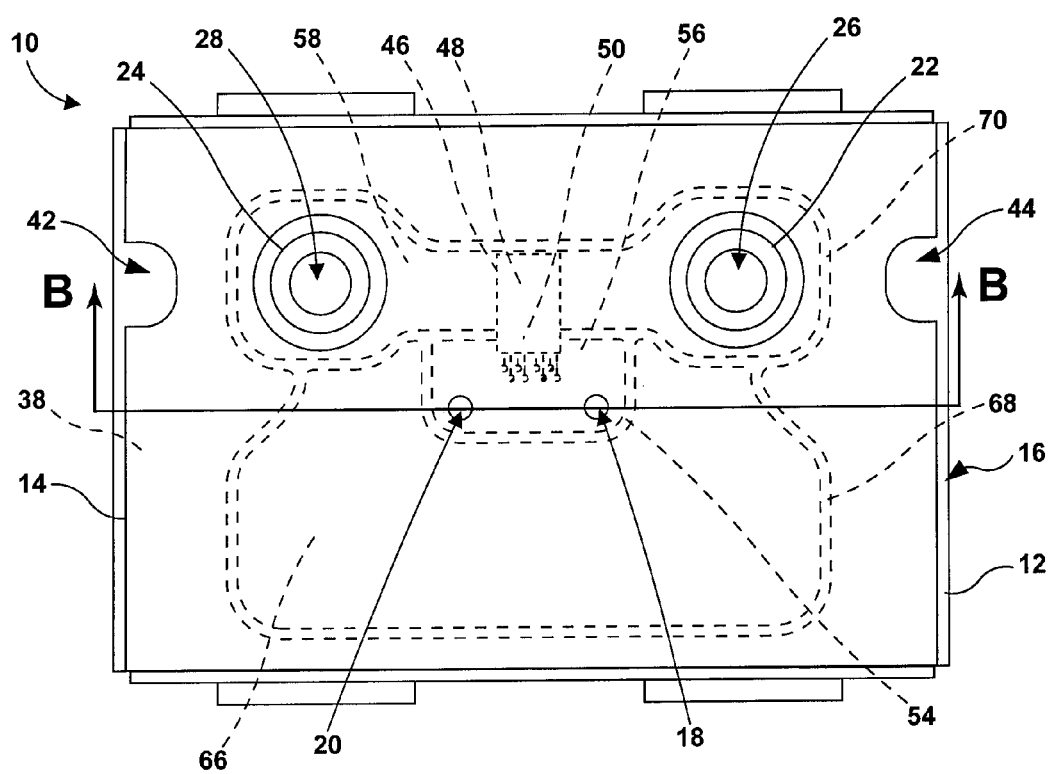
FIG. 3 is a plan view of the illustrative flow sensor assembly depicted in FIG. 1.

FIG. 2 is a plan view flow sensor assembly 10 when viewed from a side of the flow sensor assembly 10. As shown in FIG. 2, housing 12 may include a first clip 32 and a second clip 34, which may facilitate mechanical coupling between cover 14 and housing 12. As shown in FIGS. 2 and 3, first clip 32 and second clip 34 may be configured to be inserted in a first notch 42 defined by cover 14 and a second notch 44 defined by cover 14, respectively. When inserted, first clip 32 engages with cover 14 proximate to first notch 42 and second clip 34 engages with cover 14 proximate to second notch 44. Together, first clip 32 and second clip 34 may mechanically couple housing 12 to cover 14.

Although the embodiment of flow sensor assembly 10 shown in the FIG. 2 illustrates a housing 12 that includes two clips 32 and 34, in other embodiments, housing 12 may include more than two clips or fewer than two clips. In some embodiments, housing 12 may not include any clips and may be coupled to cover 14 using other mechanisms, such as an adhesive or other bonding technique.

In some embodiments, as illustrated in FIG. 3, cover 14 may define a number of notches 42 and 44 corresponding to the number of clips that housing 12 includes. Thus, in some embodiments in which housing 12 includes more than two or fewer than two clips, cover 14 may define a corresponding number of notches 42 and 44. In some instances, cover 14 may not define a number of notches 42 and 44 corresponding to the number of clips included with housing 12. For example, at least one clip 32, 34 may engage with an edge of cover 14 which is substantially linear (i.e., which defines a substantially straight line). In some instances, cover 14 may not define any notches 42 and 44, and all clips included in housing 12 may engage with a substantially linear edge of cover 14. FIG. 2 also illustrates a plurality of electrical contacts 30 extending from cover 14. The plurality of electrical contacts 30 can facilitate electrical connection between circuitry within flow sensor assembly 10 and external circuitry.

As shown in FIGS. 1 and 2, when housing 12 is coupled to cover 14 to form flow sensor assembly 10, outer surfaces of housing 12 and cover 14 may define the outer surfaces of flow sensor assembly 10. In the illustrated embodiment, the outer surfaces of flow sensor assembly 10 may include a first major surface 36 of cover 14 (FIG. 2), major exterior surface 16 of housing 12, walls 72, 74, 76, and 78 of housing 12, and first external projection 24 and second external projection 22. In other instances, the outer surfaces of flow sensor assembly 10 may be defined by more or fewer surfaces of cover 14 and housing 12.

In some cases, flow sensor assembly 10 may be used in a medical ventilator or respirator application, in which flow sensor assembly 10 may detect a mass flow rate of oxygen or air. In some implementations, cover 14 may not need to be fully enclosed and substantially isolated from the surrounding environment. For example, first major surface 36 of cover 14 may define an outer surface of flow sensor assembly 10. In some cases, this may simplify the manufacturing process of flow sensor assembly 10 compared to a flow sensor that includes a housing that encloses substantially all of the cover (e.g. electrical substrate) 12. Similarly, the materials used in flow sensor assembly 10 and the manufacture of flow sensor assembly 10 may be less expensive, due to a reduced amount of materials utilized in housing 12 and simplified assembly of cover 14 and housing 12 to form flow sensor assembly 10.

Figure 4:
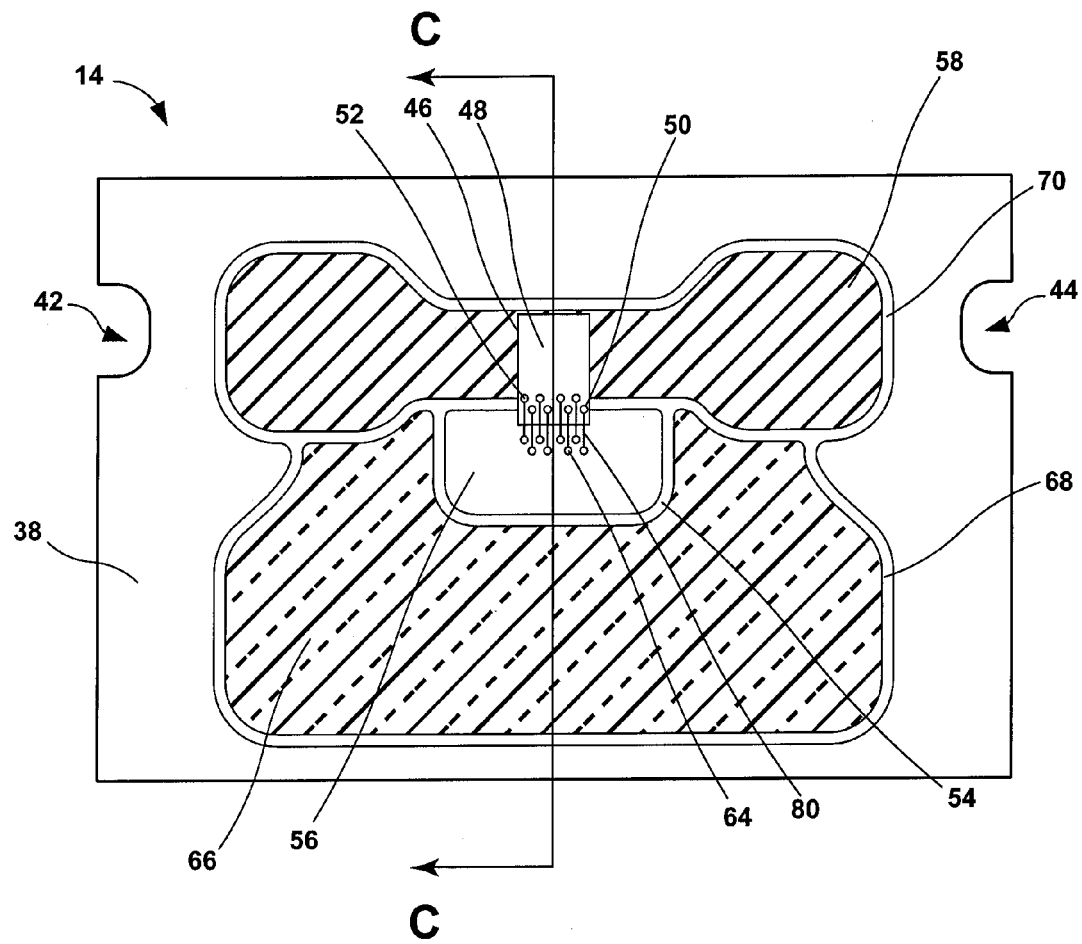
FIG. 4 is a plan view of the illustrative flow sensor assembly depicted in FIG. 2, taken along line A-A.

FIG. 3 is a plan view showing major exterior surface 16 of housing 12 as viewed from above major exterior surface 16 of FIG. 1. FIG. 3 also illustrates, in dashed lines, features formed on second major surface 38 of cover 14. FIG. 4 illustrates a plan view of second major surface 38 of cover 14 with the housing 12 removed. FIGS. 3 and 4 also illustrate first notch 42 and second notch 44 defined by cover 14 along a perimeter of the cover 14.

Second major surface 38 is oriented toward housing 12 (that is, second major surface 38 faces housing 12) and forms an interior surface of flow sensor assembly 10. As illustrated in FIG. 3, attached to second major surface 38 is flow sensor 46 (e.g., a mass flow sensor die), which generally includes a sensing portion 48 (e.g., a first portion and a wire bonding portion 50 (e.g., a second portion) and may sense fluid flowing through the flow channel 88 of the housing 12. In some embodiments, flow sensor 46 may be adhered to second major surface 38. Flow sensor 46 may be adhered to the second major surface 38 using, for example, an epoxy resin or other suitable adhesive.

In the depicted example, second major surface 38 includes at least three portions. A first major portion 58 of second major surface 38, together with a first interior surface 94 of housing 12 and second projection 102, defines flow channel 88. As described briefly above, flow channel 88 is in fluidic communication with inlet port 28 and outlet port 26. Air or another fluid may flow via inlet port 28 and through flow channel 88. In the depicted example, sensing portion 48 of flow sensor 46 is disposed within flow channel 88, allowing the flow sensor 46 to sense a mass flow rate of air or another fluid flowing through flow channel 88. The air or other fluid then flows out outlet port 26, perhaps to subsequent portions of the fluid flow path.

A second major portion 56 of second major surface 38, together with a second interior surface 96, first projection 100, and second projection 102 of housing 12, defines a first substantially enclosed cavity 90. Wire bonding portion 50 of flow sensor 46 may be disposed within first substantially enclosed cavity 90, and may be separated from flow channel 88 by first projection 100 (FIG. 6). In this way, wire bonding portion 50 may be substantially fluidly isolated from flow channel 88, which may reduce or substantially eliminate exposure of wire bonding portion 50 to the fluid flowing through flow channel 88.

In some embodiments, second projection 102 may extend toward a surface of flow sensor 46 between wire bonding portion 50 and sensing portion 48, but may not contact the surface of flow sensor 46. In some cases, this may allow room for flow sensor 46 and/or housing 12 to expand and/or contract due to changes in temperature without contact between the surface of flow sensor 46 and first projection 100. In such cases, encapsulant 86 may extend at least partially into the gap between first projection 100 and the surface of flow sensor 46 to substantially fluidly isolate first substantially enclosed cavity 90 from flow channel 88.

Figure 5:
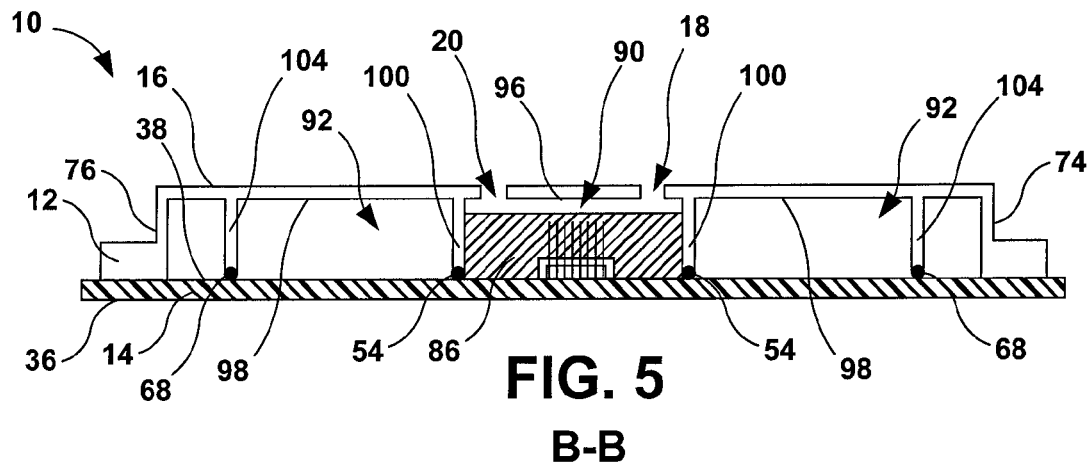
FIG. 5 is section diagram of the illustrative flow sensor assembly depicted in FIG. 3, taken along line B-B.

FIG. 3 also illustrates first aperture 18 and second aperture 20, which are defined by major exterior surface 16 of integral housing 12. As shown in FIGS. 3 and 5, first aperture 18 and second aperture 20 are positioned so that they open into first substantially enclosed cavity 90. First aperture 18 and second aperture 20 may facilitate dispensing of an encapsulant 86 (FIG. 6) into first substantially enclosed cavity 90 after housing 12 is coupled to cover 14. In some embodiments, encapsulant 86 is dispensed into first substantially enclosed cavity 90 through first aperture 18 while second aperture 20 allows venting of air from first substantially enclosed cavity 90. In other embodiments, first aperture 18 may be a vent and encapsulant 86 may be dispensed through second aperture 20. In other embodiments, major exterior surface 16 of integral housing 12 may define a single aperture opening into first substantially enclosed cavity 90, or may define more than two apertures that open into first substantially enclosed cavity 90.

A third major portion 66 of second major surface 38, together with a third interior surface 98, first projection 100, second projection 102, and a third projection 104 of housing 12, define a second substantially enclosed cavity 92. Second substantially enclosed cavity 92 may contain signal conditioning circuitry, which can perform initial processing of signals generated by flow sensor 46. For example, the signal conditioning circuitry may include at least one application specific integrated circuit (ASIC) 106 (FIG. 6), another processing unit, such as a general purpose processor, a field programmable gate array (FPGA), or passive electrical components, such as resistors, inductors, or capacitors. The signal conditioning circuitry may be electrically coupled to flow sensor 46 via at least one electrical trace carried by cover 14. Second substantially enclosed cavity 92 may be substantially fluidly isolated from first substantially enclosed cavity 90 and flow channel 88. In some embodiments, the signal conditioning circuitry is electrically coupled to at least one of the plurality of electrical contacts 30 to provide electrical communication between the signal conditioning circuitry, flow sensor 46, and electrical circuitry outside flow sensor assembly 10.

As FIGS. 3 and 4 illustrate, first major portion 58, second major portion 56, and third major portion 66 of second major surface 38 of cover 14 may be defined by a first adhesive channel 54, a second adhesive channel 68, and a third adhesive channel 70. In some embodiments, channels 54, 68, and 70 may comprise depressions in second major surface 38 of cover 14 or ridges on second major surface 38 of cover 14. In other embodiments, channels 54, 68, and 70 may be substantially coplanar with second major surface 38 of cover 14, and may simply be defined locations along which the adhesive can be dispensed.

Together, first adhesive channel 54, second adhesive channel 68, and third adhesive channel 70 define a substantially continuous interface along which first projection 100, second projection 102, and third projection 104 of housing 12 may contact the second major surface 38 of cover 14. Alternatively, or in additionally, the first adhesive channel 54, second adhesive channel 68, and third adhesive channel 70 may have one or more portions not interconnected, as show in FIGS. 7-9. An adhesive may be dispensed along first adhesive channel 54, second adhesive channel 68, and third adhesive channel 70 prior to coupling housing 12 to cover 14. The adhesive then may couple housing 12 and cover 14, and may also contribute to fluid isolation among flow channel 88, first substantially enclosed cavity 90, and second substantially enclosed cavity 92 by providing a seal between cover 14 and the respective projections 100, 102, and 104. In some embodiments, the adhesive may include an epoxy or another adhesive which is capable of adhering the materials from which cover 14 and integral housing 12 are formed.

As shown in FIG. 4, wire bonding portion 50 of flow sensor 46 includes a plurality of die wire bond pads 52. Cover 14 may include a corresponding number of cover wire bond pads 64, which are located on second major portion 56 of second major surface 38 of cover 14, within first substantially enclosed cavity 90. Electrical connection between flow sensor 46 and cover 14 is made via a plurality of wire bonds 80, each wire bond connecting a respective one of the plurality of cover wire bond pads 64 to a respective one of die wire bond pads 52. In some embodiments, at least one of cover wire bond pads 64 may be connected to ground, and at least one other of cover wire bond pads 64 may be connected to a voltage source. The electrical source and electrical ground may be used to provide a voltage bias to the mass flow sensor located on sensing portion 48 of flow sensor 46 (e.g., microbridge mass airflow sensor 60 shown in FIG. 7, a membrane flow sensor, or other flow sensor).

Figure 7:
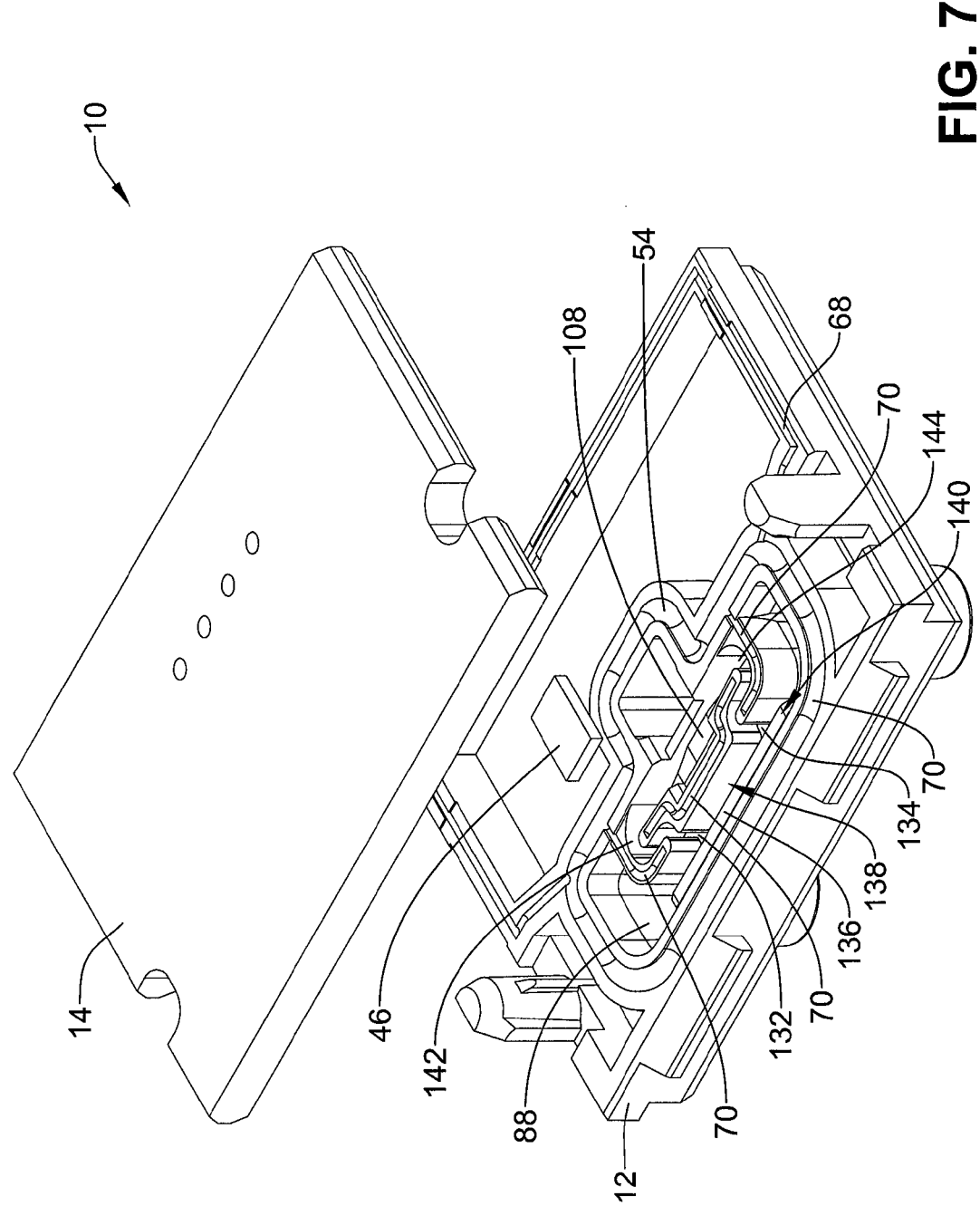
FIG. 7 is a perspective exploded view of another illustrative flow sensor assembly.

Cover wire bond pads 64 are electrically connected to electrical traces 40 carried by cover 14 (FIG. 7). In embodiments in which cover 14 is a single-layer electrical substrate, electrical traces 40 may be formed on second major surface 38. In other embodiments, cover 14 may be a multi-layer electrical substrate, and electrical traces 40 may be formed on second major surface 38, on an inner layer of cover 14, or a combination thereof. Electrical traces 40 electrically connect cover wire bond pads 64 to signal conditioning circuitry within second substantially enclosed cavity 92, such as ASIC 106. In this way, flow sensor 46 is electrically connected to signal conditioning circuitry within second substantially enclosed cavity 92, while being located in a separate, substantially fluidly isolated, first substantially enclosed cavity 90.

Because the signal conditioning circuitry is located in the second substantially enclosed cavity 92, which is substantially fluidly isolated from both first substantially enclosed cavity 90 and flow channel 88, the signal conditioning circuitry may not need to be encapsulated in an encapsulant. In some embodiments, this may reduce an amount of encapsulant used, and may reduce material costs for flow sensor assembly 10. Similarly, not encapsulating the signal conditioning circuitry may simplify and reduce the cost of manufacturing for flow sensor assembly 10 compared to an flow sensor assembly 10 in which the signal conditioning circuitry is encapsulated by an encapsulant. In other embodiments, the signal conditioning circuitry may be encapsulated with an encapsulant within second substantially enclosed cavity 92.

FIG. 6 illustrates one possible configuration of flow channel 88, which is defined, in part, by a first interior surface 94 of housing 12 that extends from major exterior surface 16 toward flow sensor 46. In some embodiments, such a configuration of first interior surface 94 may be utilized to affect a sensing range of flow sensor 46. In particular, by reducing a cross-sectional area of flow channel 88 proximate to flow sensor 46, a velocity of fluid flow may be increased. This may result in greater sensitivity for flow sensor 46, because an increase in velocity of fluid flow may increase an amount of heat transferred in microbridge mass airflow sensor 60, which will be discussed more fully below. In this way, by controlling the shape of first interior surface 94 and the cross-sectional area of flow channel 88, a sensitivity of flow sensor 46 may be controlled such that the sensitivity is appropriate for the mass flow rates with which flow sensor assembly 10 will be used. For example, in relatively low fluid flow rate applications, first interior surface 94 may extend further into flow channel 88 and reduce a cross-sectional area of flow channel 88. By contrast, in relatively higher fluid flow rate applications, first interior surface 94 may not extend as far into flow channel 88, resulting in a larger cross-sectional area of flow channel 88.

Figure 8:
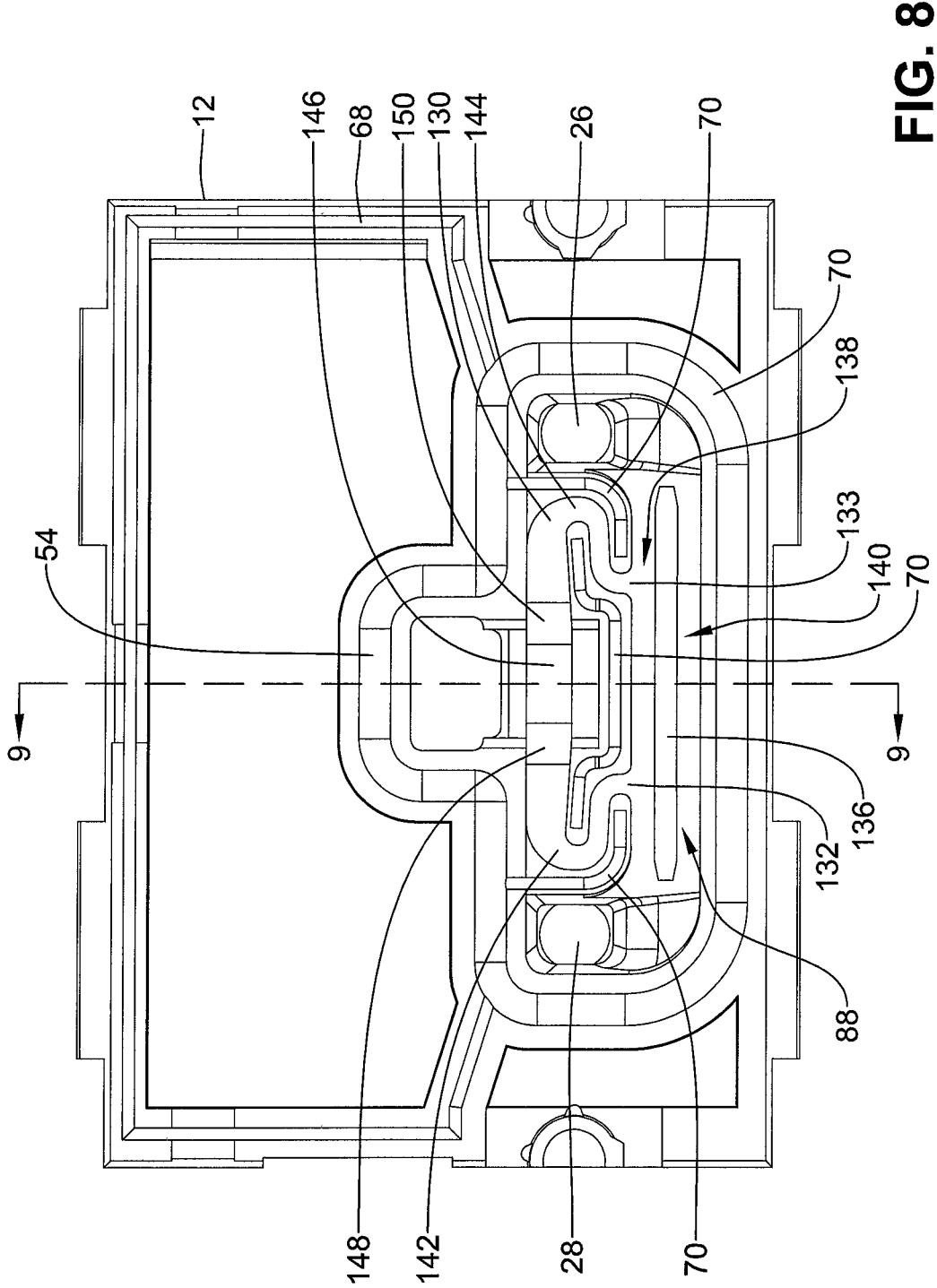
FIG. 8 is a top view of an illustrative housing of the flow sensor assembly depicted in FIG. 7.
Figure 9:
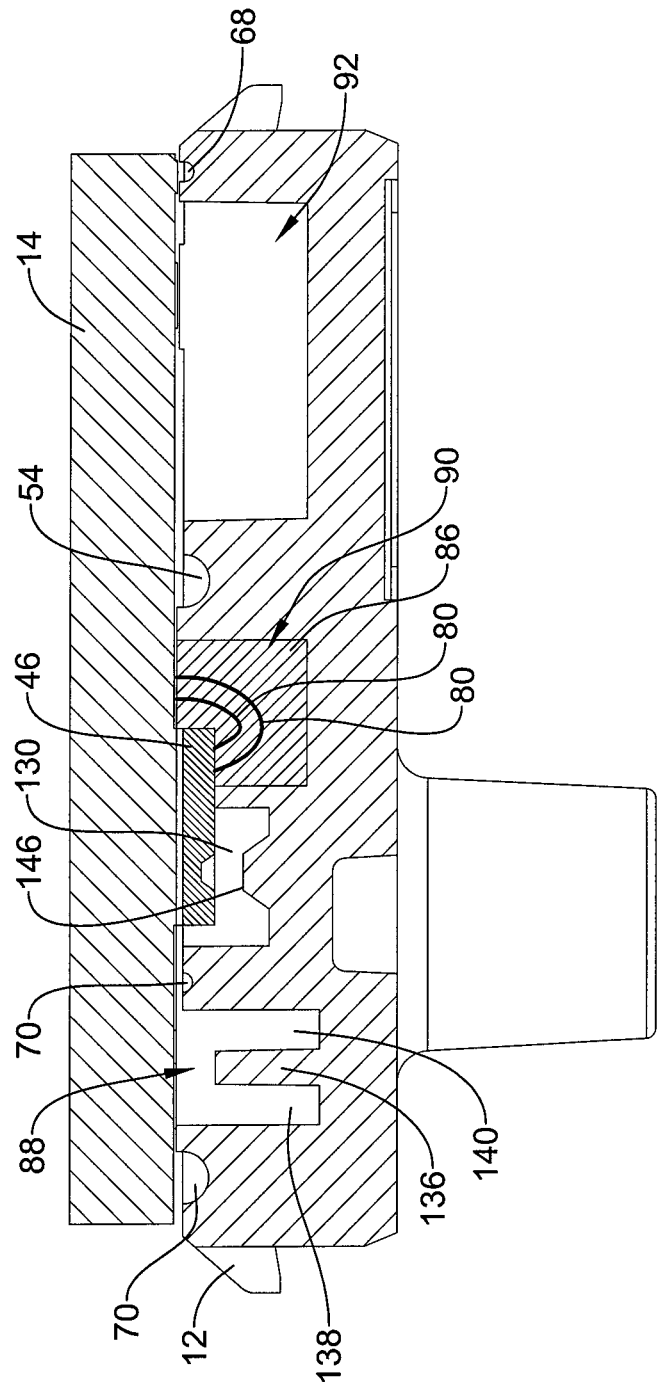
FIG. 9 is a cross-sectional diagram of the illustrative housing depicted in FIG. 8 taken along line 9-9, with an illustrative cover and an illustrative flow sensor added.

FIGS. 7-9 show another illustrative embodiment of the flow sensor assembly 10. As shown, the flow sensor assembly 10 may include a housing 12 and cover 14 for housing a flow sensor 46. The cover 14 is configured to be mounted on or otherwise sealingly engaged to the housing 12. With such a configuration, the housing 12 and cover 14 may define the flow channel 88 and/or protect the flow sensor 46 and/or any associated signal conditioning circuitry that may be situated in the flow sensor assembly 10. As illustrated in FIG. 8, the housing 12 includes an inlet port 28 and an outlet port 26 for exposing the flow channel 88 to a fluid flow. The flow sensor assembly 10 may include a flow sensor 46 positioned in or adjacent to the flow channel 88 and configured to sense a rate of fluid flow through the flow channel 88.

The illustrative flow sensor assembly 10 of FIGS. 7-9 may also include a bypass channel 130 in fluid communication with the flow channel 88, where the bypass channel 130 may allow part of a flow of fluid through the flow channel 88 to bypass part of the flow channel 88 and may be configured to reduce moisture ingress to a sensing location of the flow sensor 46. The bypass channel 130 may be configured to reverse direction of the flow of fluid in the bypass channel at least once upstream of a sensing location (e.g., at a location of the flow sensor 46 and/or, optionally, at or near boss 146). For example, the bypass channel 130 may include a first generally U-shaped section that reverses the direction of the flow of fluid in the bypass channel 130 upstream of the sensing location, and a second generally U-shaped section that reverses the direction of the flow of fluid in the bypass channel 130 downstream of the sensing location. Alternatively, or in addition, the bypass channel 130 may be configured to reverse the direction of the fluid flow relative to the direction of the fluid flow through the flow channel 88 at least one time before reaching the first U-shaped section, and/or to reverse the direction of the fluid flow relative to the direction of the fluid flow through the flow channel at least one time after exiting the second U-shaped section. In some instances, the sensing location may be located between the first U-shaped section and the second U-shaped section, and, illustratively, the bypass channel 130 may be configured to be substantially straight at the sensing location when compared to the s-shape curved portions and/or the U-shaped sections of the bypass channel 130.

As shown, the bypass channel 130 may include an upstream tap 132 and a downstream tap 133 fluid connecting the bypass channel 130 to the flow channel 88. In some instances, the flow sensor assembly 10 may include one or more partitions, such as partition 136, in flow channel 88 to at least partially define one or more fluid sub-passages or chambers, shown as sub-passages 138 and 140. In the example shown, partition 136 is provided. However, it is contemplated that other numbers of partitions may be used, such as, for example, zero, one or more partitions, two or more partitions, three or more partitions, four or more partitions, five or more partitions, six or more partitions, seven or more partitions, or any other number of partitions, as desired. The partition 136 is shown as defining two fluid sub-passages 138 and 140. However, it is contemplated that other numbers of fluid sub-passages may be provided, such as, for example, two or more sub-passages, three or more sub-passages, four or more sub-passages, five or more sub-passages, six or more sub-passages, seven or more sub-passages, eight or more sub-passages, or any other number of fluid sub-passages, as desired.

In the example shown, partition 136 may be configured to have a length, which extends in a direction parallel to the flow channel 88, and which may be greater than a width, which extends in a direction perpendicular to the flow channel 88. In the embodiment shown, each of the sub-passages 138 and 140 are fluidly connected to the other sub-passages both upstream and downstream of the partition 136, but this is not required. Also, the partition 136 may or may not be configured to fluidly isolate each of the sub-passages 138 and 140 from each other along the length of the partition 136. For example, as shown in FIG. 9, the partition 136 may be a fin type divider having a height extending only partially across the flow channel 88 in a direction perpendicular to the fluid flow. That is, and as shown in FIG. 9, partition 136 may not extend all the way to the cover 14. Also, in some embodiments, the fluid sub-passages 138 and 140 may be configured to have the same or substantially similar cross-sectional area, such that the volume of fluid flowing through each of the fluid sub-passages 138 and 140 may be the same or substantially the same. However, it is contemplated that different cross-sectional areas may be used for the fluid sub-passages 138 and 140, as desired.

In the example shown, the partition 136 can help reduce the turbulence in the fluid passing through the flow channel 88 by reducing the diameter of hydraulic radius and consequently, the Reynolds number of the fluid sub-passage. In some instances, the one or more partitions 94 may be configured to help laminarize the fluid flow in the flow channel 88 by creating a more consistent flow and mitigating turbulent effects of the flow of fluid. In some cases, the laminar flow can reduce the noise seen by the flow sensor 46, providing a more consistent, reliable, repeatable, and stable output of the flow sensor assembly 10.

In some instances, the flow sensor assembly 10 may have a first static pressure $P_1$ at the upstream tap 132 and a second static pressure $P_2$ at the downstream tap 133. The pressure differential between the upstream tap 132 and the downstream tap 133 can drive a fraction of the fluid flow through the bypass channel 130. In some cases, the fraction of the fluid may be, for example, one-fifth, one-tenth, one-fifteenth, one-twentieth, or any other suitable fraction of the fluid flow entering the inlet port 28. Although the pressure differential between the upstream tap 132 and the downstream tap 133 may be configured to drive a fraction of the fluid flow through the bypass channel 130, the pressure differential between the upstream tap 132 and the downstream tap 133 may be configured to prevent moisture ingress from fluid in the flow channel 88 to enter the bypass channel 130. Illustratively, the desired pressure differential between upstream tap 132 and the downstream tap 133 may be achieved at least partially by a tortuous or s-shaped path for bypass channel 130, as described herein or otherwise.

As shown in, for example, FIG. 8, the upstream tap 132 may be positioned downstream of an upstream end of partition 136 and the downstream tap 133 may be positioned upstream of a downstream end of the partition 136. Upstream tap 132 and downstream tap 133 may be positioned in fluid sub-passage 138. However, it contemplated that upstream tap 132 may be positioned upstream of the partition 136 and/or downstream tap 133 may be positioned downstream of partition 136.

In some embodiments, the dimensions and/or configuration of the bypass channel 130 may be set in order to provide a desired flow rate or range of flow rates across flow sensor 46 for a given flow rate or range of flow rates through the flow channel 88. Excessive fluid flow through the bypass channel 130 and across the flow sensor 46 may cause, for example, sensor saturation. Too little fluid flow through the bypass channel can result in a sensor output signal that has an insufficient dynamic range and/or resolution. In either case, flow sensor 46 may imprecisely measure the flow rate of a fluid flowing through flow sensor assembly 10. In some cases, one or more features may be provided in the bypass channel 130 to restrict the fluid flow rate through the bypass channel 130. Such features may include, for example, one or more flow restrictors formed in the upstream tap, the downstream tap and/or the bypass channel itself between the upstream tap and downstream tap. Such features may also include one or more porous inserts positioned in the upstream tap, the downstream tap and/or the bypass channel between the upstream tap and downstream tap. In some cases, the length of the bypass channel itself may be set relative to the cross sectional area of the bypass channel so as to provide a desired flow rate or range of flow rates across flow sensor 46 for a given flow rate or range of flow rates through the flow channel 88.

In some cases, and as shown in FIG. 8, the bypass channel 130 may be configured to have a generally s-shaped (or partial s-shaped) curve 142 and 144 adjacent to the upstream tap 132 and/or the downstream tap 133. For instance, the generally s-shaped curve 142 adjacent to the upstream tap 132 may initially curve back towards the inlet port 28 and then back towards the outlet port 26 and flow sensor 46. Similarly, the generally s-shaped curve 144 adjacent to downstream tap 133 may initially curve toward the outlet port 26 and then back towards the inlet 28 and flow sensor 46.

In some illustrative instances, the bypass channel 130 may include a boss 146 or other feature configured to direct the fluid up to and past the flow sensor 46. For example, boss 146 may include a first taper 148 reducing the cross-sectional area of the bypass channel 130 and a second taper 150 increasing the cross-sectional area of the bypass channel 130. In some cases, the flow sensor 46 can be positioned between the first taper 148 and the second taper 150, but this is not required.

In some embodiments, the housing 12 may define the inlet port 28, outlet port 26, three or more sides of the flow channel 88, three or more sides of the bypass channel 130, and partition 136, but this is not required. In some cases, the inlet port 28, outlet port 26, three or more sides of the flow channel 88, three or more sides of the bypass channel 130, and partition 136 (when provided) may be formed from a single part (e.g. a single molded part). In such an embodiment, the cover 14 may define the fourth, or top, side of the flow channel 88 and a fourth, or top, side of the bypass channel 130. As shown in FIG. 9, the partition 136 may be configured to have a height such that partition 136 does not engage the cover 14, or partition 136 is spaced from the cover 14. However, it is contemplated that partition 136 may be configured to have a height such that partition 136 engages the cover 14, if desired.

In an illustrative instance, the housing 12 and the cover 14 may be formed as a composite. This may, in some cases, aid in molding the housing 12 and the cover 14. However, it is contemplated that the housing 12 and cover 14 may be molded in a single piece from a plastic, ceramic, metal or any other suitable material according to design considerations. It is also contemplated that the housing may be formed by injection molding, or may be made by any other suitable methods and materials, as desired. In some cases, cover 14 may be a printed circuit board or other suitable substrate for mounting flow sensor 46 thereon.

In some embodiments, the inlet port 28 and/or the outlet port 26 may enter at an angle relative to the flow channel 88. As shown in the Figures, for example, the inlet port 28 and the outlet port 26 may be generally perpendicular (angle=90 degrees) to the flow channel 88. However, other angles are also contemplated, including no angle (in-plane with the flow channel 88). In some embodiments, the inlet port 28 and the outlet port 26 may be fluidly coupled to a main flow channel (not shown) of a larger system (such as a respirator), but this is not required.

In the illustrative embodiment, a flow sensor 46 may be in fluid communication with the bypass channel 130 of flow sensor assembly 10. When a non-zero fluid flow is present in the flow channel 88, the fluid may flow through the inlet port 28, through flow channel 88, through fluid sub-passages 138 and 140 (defined by partition 136), and through outlet port 26. This fluid flow may setup a first static pressure $P_1$ at an upstream tap 132 of the bypass channel 86 and a second static pressure $P_2$ at the downstream tap 133. This differential pressure $(P_1-P_2)$ will cause a fraction of the fluid to pass through upstream tap 132 (in some cases a fraction of fluid flowing through sub-passage 96), through bypass channel 130 and across flow sensor 46, and out downstream tap 133 and back into the flow channel 88 (in some cases back into sub-passage 96).

Although not shown, the flow sensor assembly 10 may include one or more electrical leads that are electrically connected to the flow sensor 46, which may extend external to the housing. In some cases, the one or more electrical leads may include a metal, however, any suitable conducting material may be used, as desired.

Figure 10:
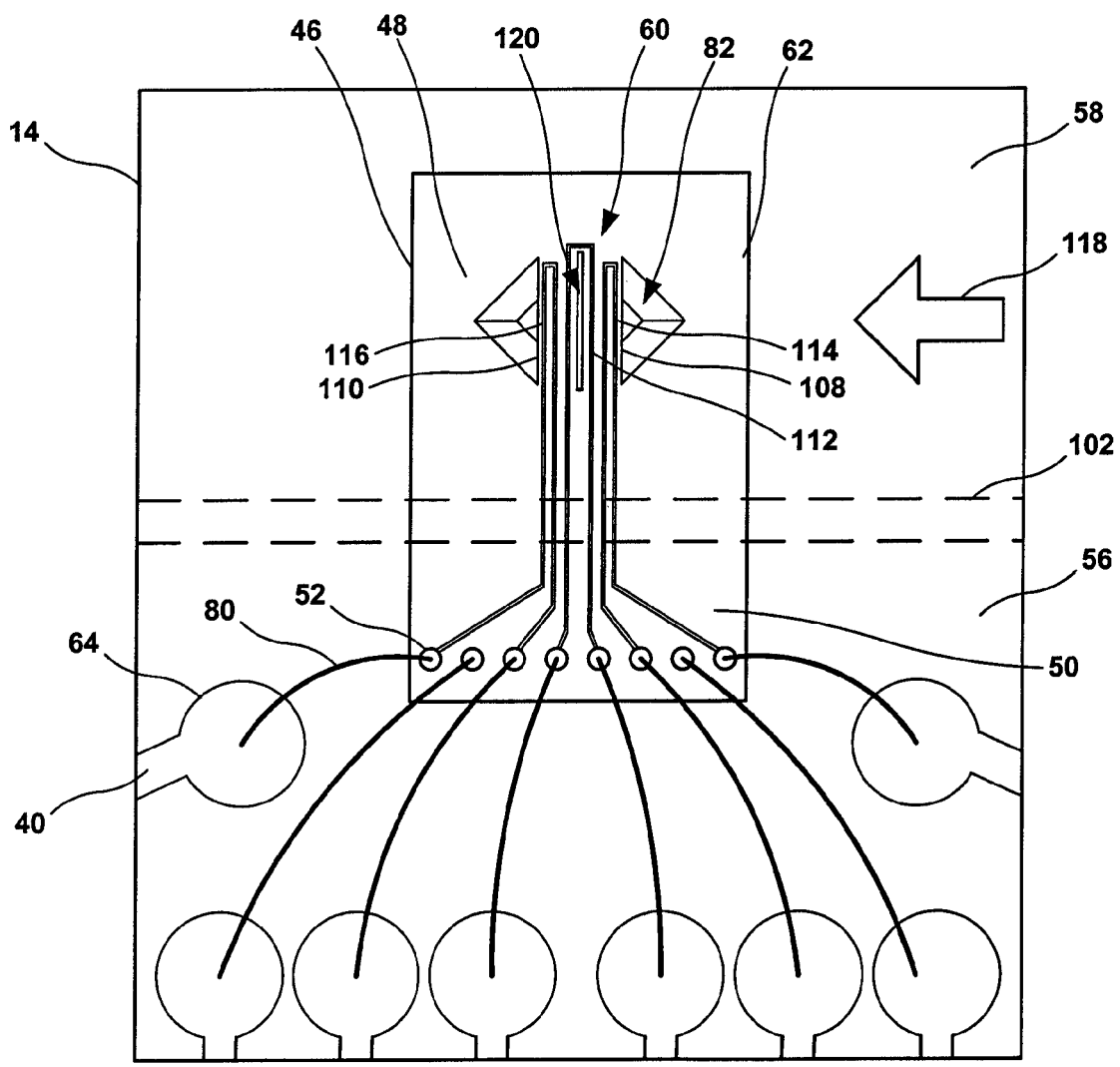
FIG. 10 is a plan view of an illustrative flow sensor.

In some embodiments, flow sensor 46 may be a Micro Electro Mechanical System (MEMS), which may include both a sensor and associated circuitry. For example, flow sensor 46 may be a MEMS-based thermal anemometer, such as a bridge, microbridge, brick, microbrick, or diaphragm mass flow sensor. In some cases, sensing portion 48 of flow sensor 46 may include a microbridge mass airflow sensor 60 and may be in thermal communication with the flow of fluid in the bypass channel 130 (as shown in FIG. 9), sub-passage 138, sub-passage 140, and/or flow channel 88 (as shown in FIG. 6). As shown in FIG. 10, microbridge mass airflow sensor 60 may include a cavity 82 defined in a silicon substrate 62. In some embodiments, cavity 82 may be etched in the silicon substrate 62 using known semiconductor processing techniques. In some cases, microbridge mass airflow sensor 60 may include an upstream bridge 108 and a downstream bridge 110, which each spanning cavity 82. Upstream bridge 108 and downstream bridge 110 may be separated by a gap 120, and may be substantially thermally isolated from silicon substrate 62. Microbridge mass airflow sensor 60 may further includes a resistive heating element 112 formed on upstream bridge 108 and downstream bridge 110. Upstream temperature sense resistor 114 is formed on upstream bridge 108 and downstream temperature sense resistor 116 is formed on downstream bridge 110, such that resistive heating element 112 is located between upstream temperature sense resistor 114 and downstream temperature resistor 116. The upstream temperature sense resistor 114 and downstream temperature resistor 116 may be coupled together in a Wheatstone bridge configuration according to some implementations and thus, may form a half Wheatstone bridge. In some cases, there are more than one upstream temperature sense resistor 114 formed on the upstream bridge 108 and more than one downstream temperature sense resistor 116 formed on the downstream bridge 110. When so provided, these temperature sensor resistors may be coupled together in a full Wheatstone bridge configuration. In some instances, an output of the flow sensor assembly 10 may be a raw sensor output signal and/or a direct voltage output from the half or full Wheatstone bridge, if desired.

The illustrative Microbridge mass airflow sensor 60 may sense a mass flow rate of the fluid flowing past microbridge mass airflow sensor 60 based on a temperature differential between upstream temperature sense resistors 114 and downstream temperature sense resistors 116. In particular, a current may be conducted through resistive heating element 112. This may cause resistive heating element 112 to be heated above an ambient temperature of microbridge mass airflow sensor 60. At steady state (i.e., in the absence of substantial fluid flow through flow channel 88), a temperature distribution within upstream bridge 108 may be substantially symmetrical (e.g., a mirror image) with the temperature distribution within downstream bridge 110.

When a fluid flows past the microbridge mass airflow sensor 60 in the direction indicated by arrow 118, upstream temperature sense resistors 114 are cooled, while downstream temperature sense resistors 116 are heated. The temperature sense resistors may have a relatively high temperature coefficient. Thus, when the upstream temperature sense resistors 114 and downstream temperature sense resistors 116 are connected in a Wheatstone bridge circuit, the temperature difference between upstream temperature sense resistors 114 and downstream temperature sense resistors 116 may result in a voltage difference between the resistors 114 and 116, which can be used to determine a mass flow rate of the fluid past the mass airflow sensor 60.

In other implementations, flow sensor 46 may include a brick or microbrick mass flow sensor. A brick or microbrick mass flow sensor may generally be similar to the microbridge mass flow sensor 60, but may not include cavity 82 etched in silicon substrate 62. Because of this, a brick or microbrick mass flow sensor may have a higher thermal mass and respond more slowly to thermal influences, and may be less sensitive. However, they may be less expensive and more durable.

In some instances, flow sensor 46 may include a diaphragm mass flow sensor. A diaphragm mass flow sensor may include a thin diaphragm of silicon covering an etched cavity. The temperature sense resistors (e.g., resistors 114 and 116) and resistive heating element (e.g., resistive heating element 112) may be formed on the diaphragm. In some instances, a diaphragm mass flow sensor may have a thermal mass between the thermal mass of a brick or microbrick mass flow sensor and the thermal mass of a microbridge mass airflow sensor 60.

In other cases, flow sensor 46 may include another type of mass flow sensor, such as a membrane sensor, in which a cavity is formed in a silicon substrate and the cavity is covered with a silicon or glass film. A membrane sensor may detect a mass flow rate by sensing a differential pressure across the membrane. Other flow sensors may also be utilized in flow sensor assembly 10.

Figure 11:
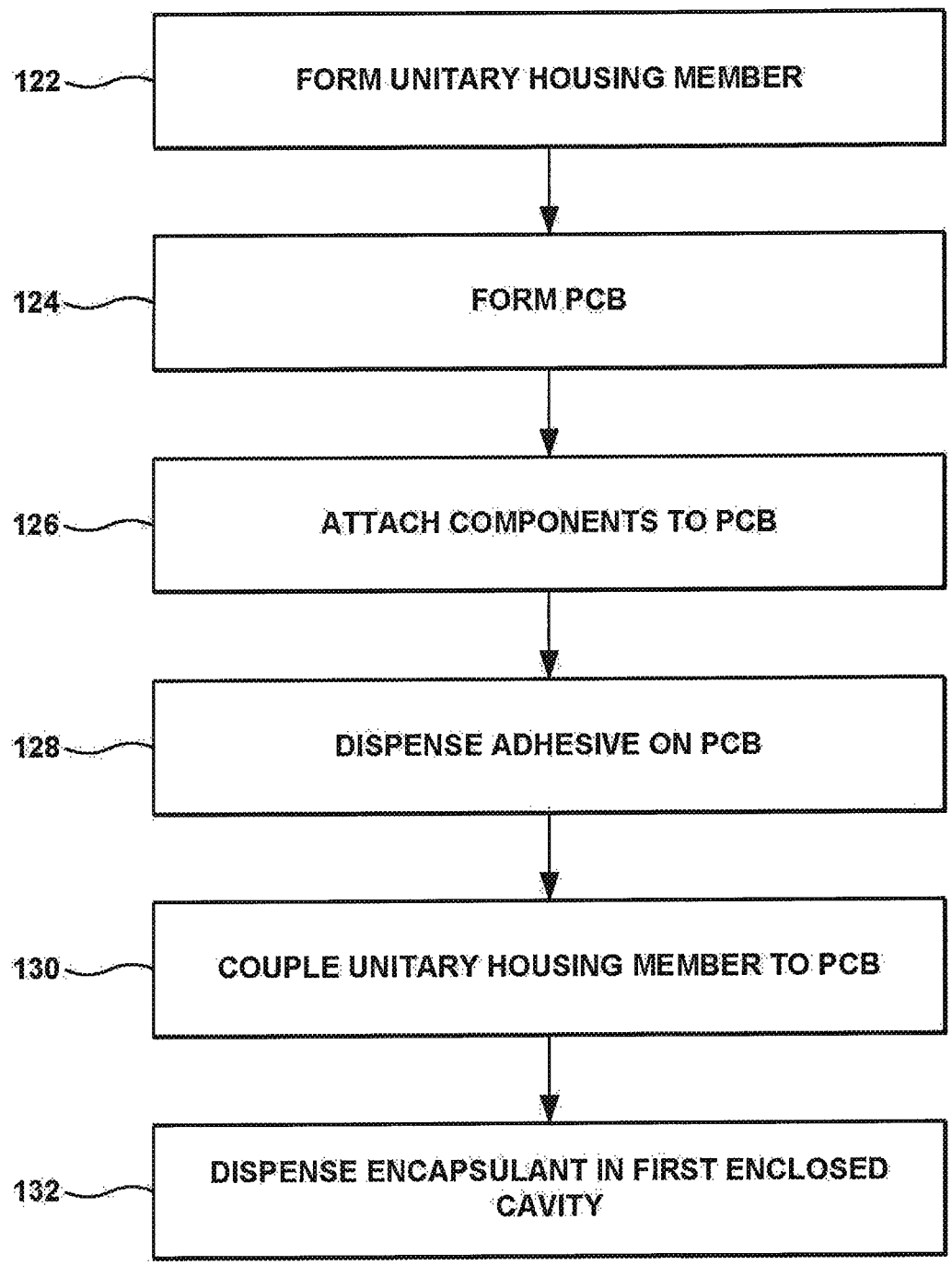
FIG. 11 is a flow diagram of an illustrative technique for manufacturing a flow sensor assembly.

FIG. 11 is a flow diagram illustrating an example technique for manufacturing flow sensor assembly 10. Initially, the method includes forming housing 12 (122). In some embodiments, housing 12 includes a polymer or plastic or other material, and may be formed by, for example, injection molding, compression molding, or any other manufacturing technique. As described above, the unitary nature of housing 12 may simplify production and reduce costs associated with manufacture compared to a housing member that includes multiple portions.

In a separate step, the technique includes forming cover 14 (124). In some embodiments, forming cover 14 (124) includes forming a single-layer cover 14, while in other embodiments, forming cover 14 (124) includes forming a multi-layer cover 14. Whether cover 14 includes a single layer or multiple layers may depend on, for example, the extent and complexity of the circuitry attached to cover 14, including, for example, flow sensor 46, another sensor, signal conditioning circuitry such as ASIC 106 or another processing unit, or passive components such as resistors, capacitors, and inductors. In some embodiments, cover 14 may include a single layer, which may further reduce material and manufacturing costs associated with flow sensor assembly 10 compared to a mass flow sensor including a more complex design (e.g., a multilayer electrical substrate).

Once cover 14 is formed, the technique continues with attaching components to cover 14 (126). Components attached to cover 14 include flow sensor 46, any other sensors utilized in mass flow sensor apparatus, such as a humidity sensor, temperature sensor, or the like, and signal conditioning circuitry, such as ASIC 106 and/or passive components. As described above, flow sensor 46 may be physically attached to cover 14 using an adhesive, and may be electrically connected to cover 14 using wire bonds 80. In some embodiments, the adhesive may include a thermal cure adhesive. Both physical and electrical connection of components to cover 14 are included within the step of attaching components to cover 14 (126). In some embodiments, electrically connecting components to electrical traces on cover 14 may include soldering electrically conductive portions of the components to the electrical traces on cover 14. For example, wire bonds 80 may be reflow soldered to die wire bond pads 52 on flow sensor 46 and cover wire bond pads 64 on cover 14. In other examples, wire bonds 80 may be thermosonically bonded to die wire bond pads 52 on flow sensor 46 and cover wire bond pads 64 on cover 14.

Once the predetermined components are attached to cover 14, the technique continues with dispensing adhesive on cover 14 along a predetermined path (128). As illustrated in FIGS. 3 and 4, the predetermined path may include first adhesive channel 54, second adhesive channel 68, and third adhesive channel 70. As described above, the adhesive couples projections 100, 102, 104 of housing 12 to cover 14 at predetermined points or along a predetermined path. In some embodiments, the adhesive contributes to substantial fluid isolation among flow channel 88, first substantially enclosed cavity 90, and second substantially enclosed cavity 92. The adhesive may include any adhesive suitable for coupling cover 14 to the material from which housing 12 is formed. For example, the adhesive may include an epoxy or the like. In other examples, instead of or in addition to dispensing adhesive on cover 14 along the predetermined path (128), the technique may include dispensing adhesive on at least a portion of first projection 100, second projection 102, and/or third projection 104 of housing 12.

After the adhesive is dispensed on cover 14 along the predetermined path (128) (or on at least a portion of one or more of the projections 100, 102, 104), housing 12 is coupled to cover 14 (130). In some embodiments, coupling housing 12 to cover 14 (130) includes aligning first clip 32 and second clip 34 with first notch 42 and second notch 44, respectively, and inserting first clip 32 in first notch 42 and second clip 34 in second notch 44. In other embodiments, housing 12 may not include first clip 32 and second clip 34, and coupling housing 12 to cover 14 (130) does not include fitting first clip 32 and second clip 34 in first notch 42 and second notch 44.

In any case, coupling housing 12 to cover 14 (130) includes positioning projections 100, 102, 104 in substantial alignment with the adhesive dispensed along first adhesive channel 54, second adhesive channel 68, and third adhesive channel 70, and contacting the projections 100, 102, 104 to the adhesive. Additionally, in some embodiments, coupling housing 12 to cover 14 (130) may include curing the adhesive, e.g., via heat, radiation, or the like, or allowing the adhesive to set. In this way, the adhesive adheres housing 12 to cover 14 and contributes to substantial fluid isolation among flow channel 88, first substantially enclosed cavity 90, and second substantially enclosed cavity 92, along with cover 14 and housing 12.

The technique illustrated in FIG. 11 further includes dispensing encapsulant 86 in first substantially enclosed cavity 90 (132). As described above, first aperture 18 and a second aperture 20 permit access to first substantially enclosed cavity 90 after housing 12 and cover 14 are coupled together. Encapsulant 86 may be dispensed through one of first aperture 18 or second aperture 20 in liquid form via a nozzle. Once dispensed through first aperture 18 or second aperture 20, encapsulant 86 may flow around wire bonds 80, die wire bond pads 52 and cover wire bond pads 64 to substantially encapsulate wire bonds 80 and wire bond pads 52 and 64. Encapsulant 86 may then set (i.e., increase in viscosity), crosslink, or cure to form a substantially non-flowing material. In some embodiments, encapsulant 86 may substantially fill cavity 90. In other embodiments, encapsulant 86 may cover wire bonds 80, die wire bond pads 52, and cover wire bond pads 64, but may not substantially fill cavity 90. As described above, in some embodiments, encapsulant 86 includes silicone, such as a fluorosilicone or a dimethyl silicone. Encapsulant 86 may reduce or substantially prevent contact between the fluid flowing through flow channel 88 and wire bonds 80, die bond pads 52 and cover wire bond pads 64. This may reduce or substantially eliminate risk of corrosion or oxidation of wire bonds 80, die bond pads 52 and cover die pads 64, which may otherwise occur due to presence of oxygen, water vapor, or another chemical species in the fluid flowing through flow channel 88.

Alternatively, or in addition to the technique depicted in FIG. 11, an illustrative technique 160 for forming a package (e.g., a die only package or other package) configured to provide moisture ingression protection for the sense die is shown in FIG. 12. Initially, the technique may include providing a housing 12 having a flow channel 88 and a bypass channel 130 that may extend from the flow channel 88 (step 162). The bypass channel 130 may define a tortuous path that may provide a level of moisture ingression protection to the sensing location in the bypass channel 130. In some cases, a flow sensor die 46 having two or more sense elements and one or more wire bond pads 52 may be provided (step 164) and installed at the sensing location in the bypass channel 130 (step 166). Illustratively, bonds (e.g., wire bonds 80) may be used to bond wire bond pads 52 to a lead frame or electrical traces 40 (e.g., via bond pads 64) (step 168). Once the wire bonds 80 have been established, the wire bond pads 52 and 64 may be covered and/or encapsulated with an encapsulant 86, while not covering the two or more sense elements with the encapsulant 86 (step 170). In some cases, the encapsulant 86 may be inserted into a fill hoe 20, 18 of the housing 12 until the wire bond pads 52, 64 and wire bonds 80 may be covered with the encapsulant 86 or until any other time, as desired. Further, the cover 14 may be secured to the housing 12 to further form the flow channel 88 or for other purposes.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A flow sensor assembly, comprising:
   a housing defining an inlet, an outlet, and a flow channel extending between the inlet and the outlet, the flow channel configured to accept a flow of fluid;
   the housing defining a bypass channel that allows part of the flow of fluid through the flow channel to bypass part of the flow channel, the bypass channel is configured to reverse the direction of the flow of fluid in the bypass channel at least once upstream of a sensing location;
   a flow sensor die having two or more sense elements, one or more heater elements, and one or more bond pads operatively coupled to the two or more sense elements and the one or more heater elements, the one or more bond pads are positioned in a first region of the flow sensor die and the two or more sense elements and the one or more heater elements are positioned in a second region of the flow sensor die;
   the flow sensor die is secured relative to the housing at the sensing location of the bypass channel such that the two or more sense elements are in thermal communication with the flow of fluid in the bypass channel;
   the housing defining a partition between the first region and the second region of the flow sensor die when the flow sensor die is secured relative to the housing at the sensing location; and
   an encapsulant provided adjacent the first region of the flow sensor die to cover the one or more bond pads of the flow sensor die, the partition of the housing substantially containing the encapsulant from covering the two or more sense elements and the one or more heater elements that are positioned in the second region of the flow sensor die.

2. The flow sensor assembly of claim 1, wherein the bypass channel is configured to reverse the direction of the flow of fluid in the bypass channel at least once downstream of the sensing location.

3. The flow sensor assembly of claim 1, wherein the two or more sense elements are arranged in a full Wheatstone bridge.

4. The flow sensor assembly of claim 3, wherein an output of the flow sensor assembly is a direct voltage output from the full Wheatstone bridge.

5. The flow sensor assembly of claim 1, further comprising:
one or more wire bonds bonded to the one or more wire bond pads; and
the encapsulant covering the one or more wire bonds.

6. The flow sensor assembly of claim 1, wherein the bypass channel includes a first U-shaped section that reverse the direction of the flow of fluid in the bypass channel upstream of the sensing location, and a second U-shaped section that reverse the direction of the flow of fluid in the bypass channel downstream of the sensing location.

7. The flow sensor assembly of claim 6, wherein the sensing location is between the first U-shaped section and the second U-shaped section.

8. The flow sensor assembly of claim 7, wherein the bypass channel is substantially straight at the sensing location.

9. The flow sensor assembly of claim 6, wherein the bypass channel is configured to reverse the direction of the fluid flow relative to the direction of fluid flow through the flow channel at least one time before reaching the first U-shaped section, and to reverse the direction of the fluid flow relative to the direction of fluid flow though the flow channel at least one time after exiting the second U-shaped section.

10. The flow sensor assembly of claim 1, wherein the one or more bond pads are positioned along one side of the flow sensor die, with the two or more sense elements and the one or more heater elements situated away from the one or more bond pads and towards an opposite side of the flow sensor die.

11. The flow sensor assembly of claim 1, wherein the bypass channel is configured to reduce moisture ingress to the sensing location.

12. A flow sensor assembly, comprising:
a housing defining an inlet, and outlet, and a flow channel extending between the inlet and the outlet, the flow channel configured to accept a flow of fluid;
the housing defining a bypass channel that allows part of the flow of fluid through the flow channel to bypass part of the flow channel, the bypass channel is configured to reduce moisture ingress to a sensing location in the bypass channel;
a flow sensor die having one or more sense elements and one or more bond pads operatively coupled to the one or more sense elements, the one or more bond pads are positioned in a first region of the flow sensor die and the one or more sense elements are positioned in a second region of the flow sensor die;
the flow sensor die is secured relative to the housing at the sensing location of the bypass channel such that the one or more sense elements are in thermal communication with the flow of fluid in the bypass channel;
one or more wire bonds bonded to the one or more wire bond pads;
an encapsulant provided adjacent the first region of the flow sensor die to cover the one or more bond pads of the flow sensor die and the one or more wire bonds; and
wherein an output of the flow sensor assembly is a raw sensor output signal produced by the one or more sensor elements.

13. The flow sensor assembly of claim 12, wherein the one or more sense elements are configured in a full Wheatstone bridge, and the output of the flow sensor assembly is the raw sensor output signal of the full Wheatstone bridge.

14. The flow sensor assembly of claim 12, wherein the bypass channel includes a first U-shaped section that reverse a direction of the flow of fluid in the bypass channel upstream of the sensing location.

15. The flow sensor assembly of claim 14, wherein the bypass channel includes a second U-shaped section that reverse the direction of the flow of fluid in the bypass channel downstream of the sensing location.

16. The flow sensor assembly of claim 15, wherein the sensing location is between the first U-shaped section and the second U-shaped section.

17. The flow sensor assembly of claim 15, wherein the bypass channel is configured to reverse the direction of the fluid flow relative to the direction of fluid flow though the flow channel at least one time before reaching the first U-shaped section, and to reverse the direction of the fluid flow relative to the direction of fluid flow though the flow channel at least one time after exiting the second U-shaped section.

* * * * *